US011770383B2

(12) United States Patent
Smith

(10) Patent No.: US 11,770,383 B2
(45) **Date of Patent: *Sep. 26, 2023**

(54) CLOUD-TO-DEVICE MEDIATOR SERVICE FROM SERVICES DEFINITION

(71) Applicant: Intel Corporation, Santa Clara, CA (US)

(72) Inventor: Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,786

(22) Filed: May 10, 2022

(65) Prior Publication Data

US 2022/0377069 A1 Nov. 24, 2022

Related U.S. Application Data

(63) Continuation of application No. 16/613,666, filed as application No. PCT/US2018/037854 on Jun. 15, 2018, now Pat. No. 11,336,654.

(Continued)

(51) Int. Cl.

*H04L 9/40* (2022.01)
*H04W 12/084* (2021.01)

(Continued)

(52) U.S. Cl.

CPC ........ *H04L 63/105* (2013.01); *H04L 63/0807* (2013.01); *H04L 63/0815* (2013.01);

(Continued)

(58) Field of Classification Search

CPC .... H04B 7/0626; H04B 1/005; H04B 7/0413; H04B 1/56; H04B 1/58; H04L 5/14; H04L 5/0053; H04W 72/0446

See application file for complete search history.

(56) References Cited

U.S. PATENT DOCUMENTS

| | | | |
|---|---|---|---|
| 9,054,961 | B1 | 6/2015 | Kim et al. |
| 11,336,654 | B2 | 5/2022 | Smith |

(Continued)

FOREIGN PATENT DOCUMENTS

| | | | |
|---|---|---|---|
| WO | WO-2017019871 | A1 | 2/2017 |
| WO | WO-2018232304 | A1 | 12/2018 |

OTHER PUBLICATIONS

"U.S. Appl. No. 16/613,666, Non Final Office Action dated Jul. 19, 2021", 14 pgs.

(Continued)

*Primary Examiner* — Mohammed Waliullah

(74) *Attorney, Agent, or Firm* — Schwegman Lundberg & Woessner, P.A.

(57) ABSTRACT

Various systems and methods of establishing and utilizing device management (DM) services in Internet of Things (IoT) networks and similar distributed network architectures, are described herein. In an example, a Cloud-To-OCF Device mediator service may be established from OCF services definition; this mediator service may be used to establish connectivity between a cloud-capable device and a cloud-based service. Further systems and methods to provide a proxy access service (PAS) hosted on a cloud service provider, that enable a PAS to coordinate and preserve device-to-device interactions from end-to-end, are also disclosed.

24 Claims, 11 Drawing Sheets

Related U.S. Application Data

(60) Provisional application No. 62/581,495, filed on Nov. 3, 2017, provisional application No. 62/523,089, filed on Jun. 21, 2017, provisional application No. 62/521,079, filed on Jun. 16, 2017.

(51) Int. Cl.
*H04L 67/12* (2022.01)
*H04W 12/086* (2021.01)

(52) U.S. Cl.
CPC ...... *H04L 63/0876* (2013.01); *H04L 63/0884* (2013.01); *H04L 63/20* (2013.01); *H04L 67/12* (2013.01); *H04W 12/084* (2021.01); *H04W 12/086* (2021.01)

(56) References Cited

U.S. PATENT DOCUMENTS

| | | | | |
|---|---|---|---|---|
| 2014/0096199 | A1* | 4/2014 | Dave | H04L 63/0884 726/4 |
| 2014/0157363 | A1* | 6/2014 | Banerjee | H04L 63/10 726/2 |
| 2014/0281540 | A1* | 9/2014 | Brouwer | H04L 63/061 713/169 |
| 2015/0033297 | A1* | 1/2015 | Sanso | H04L 63/126 726/5 |
| 2016/0134616 | A1* | 5/2016 | Koushik | H04L 63/08 726/9 |
| 2016/0323689 | A1 | 11/2016 | Goluboff | |
| 2018/0063879 | A1* | 3/2018 | Lee | H04W 76/14 |
| 2020/0021446 | A1* | 1/2020 | Roennow | H04L 63/0435 |
| 2021/0168132 | A1 | 6/2021 | Smith | |

OTHER PUBLICATIONS

"U.S. Appl. No. 16/613,666, Notice of Allowance dated Jan. 11, 2022", 9 pgs.

"U.S. Appl. No. 16/613,666, Preliminary Amendment filed Nov. 14, 2019", 9 pgs.

"U.S. Appl. No. 16/613,666, Response filed Oct. 15, 2021 to Non Final Office Action dated Jul. 19, 2021", 13 pgs.

"International Application Serial No. PCT/US2018/037854, International Preliminary Report on Patentability dated Dec. 26, 2019", 8 pgs.

"International Application Serial No. PCT/US2018/037854, International Search Report dated Oct. 4, 2018", 5 pgs.

"International Application Serial No. PCT/US2018/037854, Written Opinion dated Oct. 4, 2018", 6 pgs.

"OCF Core Specfication V1.0.0 Part 1", Open Connectivity Foundation (OCF), (Mar. 22, 2017), 175 pgs.

"OCF Security Specification V1.0.0", Open Connectivity Foundation (OCF), [Online] Retrieved from the internet: <https://openconnectivity.org/draftspecs/OCF_Securi ty_Speci fi cati on_vl.0.0.pdf>, (Mar. 22, 2017), 104 pgs.

Kwon, O-Hoon, "Tizen IoT : Overview & Future", Tizen Developer Conference, [Online] Retrieved from the internet: <https://swoogo.s3.amazonaws.com/upload s/47248-9288844c82ee.pdf>, (May 16-17, 2017), 18-19.

* cited by examiner

CLOUD-TO-DEVICE MEDIATOR SERVICE FROM SERVICES DEFINITION

PRIORITY CLAIM

This application is a continuation of U.S. patent application Ser. No. 16/613,666, filed Nov. 14, 2019, which is a U.S. National Stage Application under 35 U.S.C. 371 from International Application No. PCT/US2018/037854, filed Jun. 15, 2018, published as WO 2018/232304, which claims the benefit of priority to U.S. Application Ser. No. 62/521,079, filed Jun. 16, 2017, U.S. Application Ser. No. 62/523,089, filed Jun. 21, 2017, and U.S. Application Ser. No. 62/581,495, filed Nov. 3, 2017, each of which is incorporated herein by reference in its entirety.

TECHNICAL FIELD

Embodiments described herein generally relate to interconnected device networks, and in particular, to techniques for establishing connections and implementing functionality among internet of things (IoT) devices and device networks.

BACKGROUND

IoT devices are physical objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
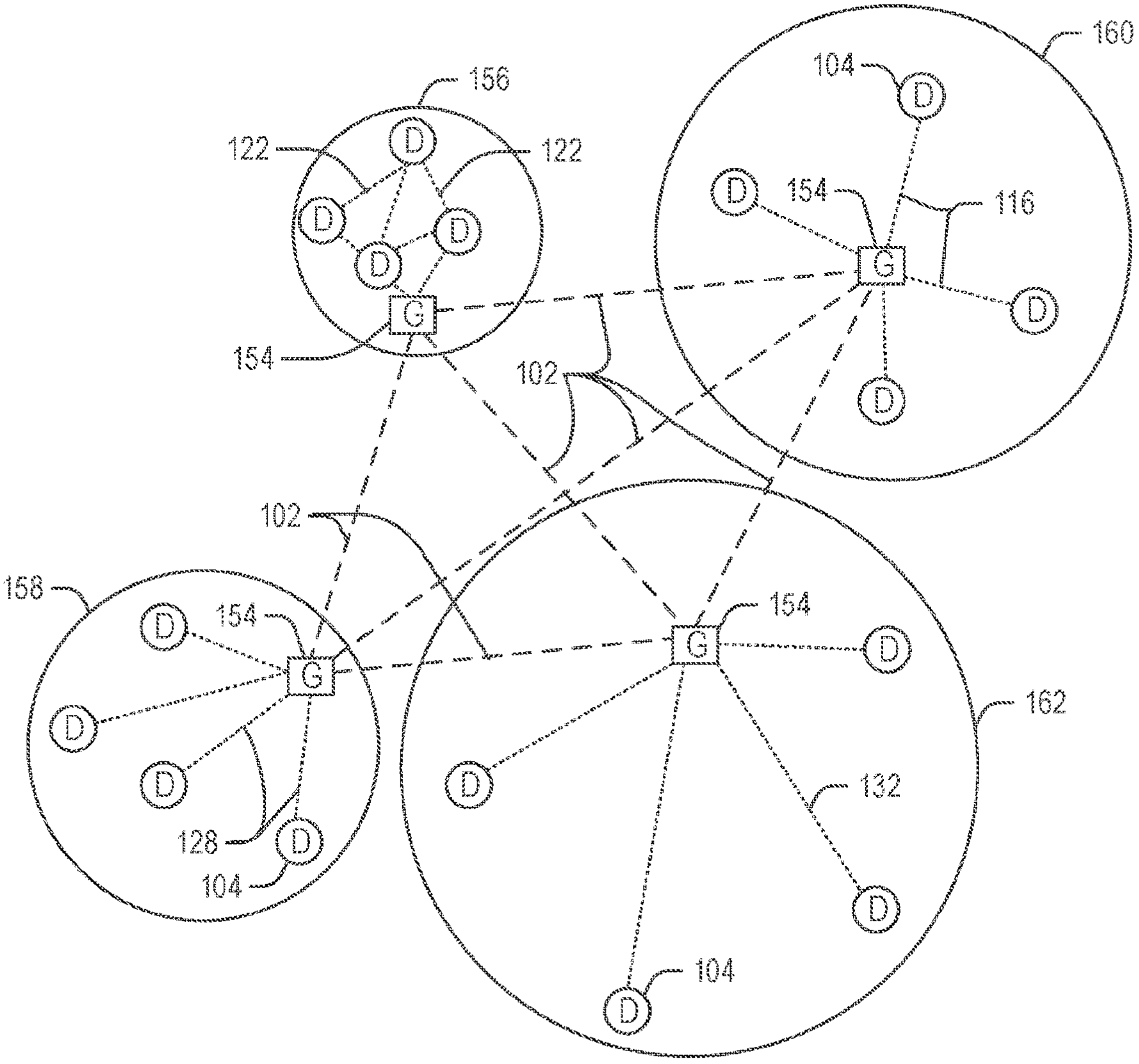
FIG. 1 is a diagram that illustrates a domain topology for respective internet-of-things (IoT) networks coupled through links to respective gateways, according to an example.

In the following description, methods, configurations, and related apparatuses are disclosed for configuring and utilizing a cloud-to-device mediator service, with this mediator service established and operated using a services definition within an IoT framework. The approaches discussed herein establish improvements to an IoT resource model abstraction, to allow a mediator service to be dynamically configured and launched upon a configurable device resource. As discussed herein, a mediator service may be operated in the fashion of an IoT device service that can be dynamically provisioned along with other device management services; this mediator service, once configured and operational, then may introduce another dynamically provisioned device to a cloud, and introduce the cloud to the dynamically provisioned device.

As discussed herein, the present techniques and configurations for a cloud-to-device mediator service provide improvements for a variety of IoT device management and network operation use cases. This results in a number of technical benefits, including improved security through the use of a sandbox domain and network separation, as an ad hoc domain is created to facilitate interactions between untrusted devices (relative to the devices' trusted home domains). Improved security is also introduced through the use of a device state transition during the mediator service introduction and preparation for introduction to the sandbox domain, such that the device is not capable of interacting with the device's home domain devices. Further, the techniques discussed herein may be coordinated for the use of multiple mediator services, to facilitate introduction of multiple devices (respectively) into the sandbox domain without a priori in-band trust negotiations between their respective onboarding services.

In the examples provided with reference to an OCF network implementation, a Cloud-To-OCF-Device Mediator Service may be established from an OCF Services Definition. The OCF Services Definition is a service abstraction that allows multiple services in a domain to be built, instantiated, and controlled, in the same manner as a device. The deployment of a Cloud-To-OCF-Device Mediator Service in a device management services resource model abstraction provides a life cycle wrapped around the mediator service, to allow an instance of the mediator service to be dynamically brought into operation, used for useful operations, and transitioned to another instance of the Mediator Service if the instance fails. However, the deployment of the Mediator Service may be instantiated or launched in other fashions.

As discussed herein, the Mediator Service may be used to perform a specialized onboarding function, where the new device and cloud service are onboarded into an enclaved network domain (e.g., a protected, isolated, or other security-restricted domain, or network access controlled (NAC) environment, or quarantine network, or orchestrated micro-services, or pod of Kata containers, or a collection of virtual machines or some combination of these) consisting of only the device and the cloud service (and the mediator service). These entities may interact to enable limited access to a new device and a cloud service, to perform useful functions such as allowing devices from a peer domain (that is not yet trusted by all the devices in the first domain) to interact. These and other benefits of the presently disclosed approaches within standardized network implementations and similar IoT network settings will be apparent from the following disclosure.

In further examples, techniques are disclosed for configuring and using a proxy access service to enable cloud access by a roaming device. These techniques enable device connection and operation in an IoT device interconnection setting through the use of the proxy access service, as the proxy access service enables enable cloud access by a roaming IoT device to a local fog of devices. The use and configuration of the presently described proxy access service may be applicable in networks and systems of devices such as in implementations of OCF standard-based networks and devices (including fog implementations, for a network of devices operating as a fog).

IoT network deployments in a local network are often not accessible to devices that roam outside the local network, even though such roaming devices may want to continue to interact with remaining devices on the network. The techniques and configurations described herein invention address this scenario by hosting a proxy access service (a "PAS") on a cloud service provider (e.g., a third party service provider such as Amazon Web Services, Microsoft Azure, and the like). A PAS may be in the form of a gateway between networks, a container orchestration server, an edge network concentrator, an attestation agent device, a network security sentinel device, a network management node, a network security telemetry collection point or any network node that links connectivity between a first logical domain of connected things with a second.

In contrast to conventional uses of a trusted cloud service, the PAS configuration described herein may preserve device-to-device interactions, including end-to-end details of such interactions. Further, as discussed herein, IoT data may be communicated between roaming and local devices, even while the data remains not disclosed to the PAS.

As discussed herein, the PAS may operate as a set of cloud-hosted services that manages a set of Proxy Access Rules (PAR) to describe which roaming device(s) may access (or be accessed by) which local device(s). As a result, various IoT devices in a local network or fog are enabled to roam outside the local network environment, but still retain the access control policies, credentials, and connectivity capabilities already familiar or known to such devices.

As used herein, references to a "device" refer to a logical entity that assumes one or more roles (e.g., as a client or server); references to a "service" refer to a functionality or group of functionalities that are provided by an entity (such as a device) for a specific purpose, such as to perform a task, manage some data, or perform some other activity.

FIG. 1 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
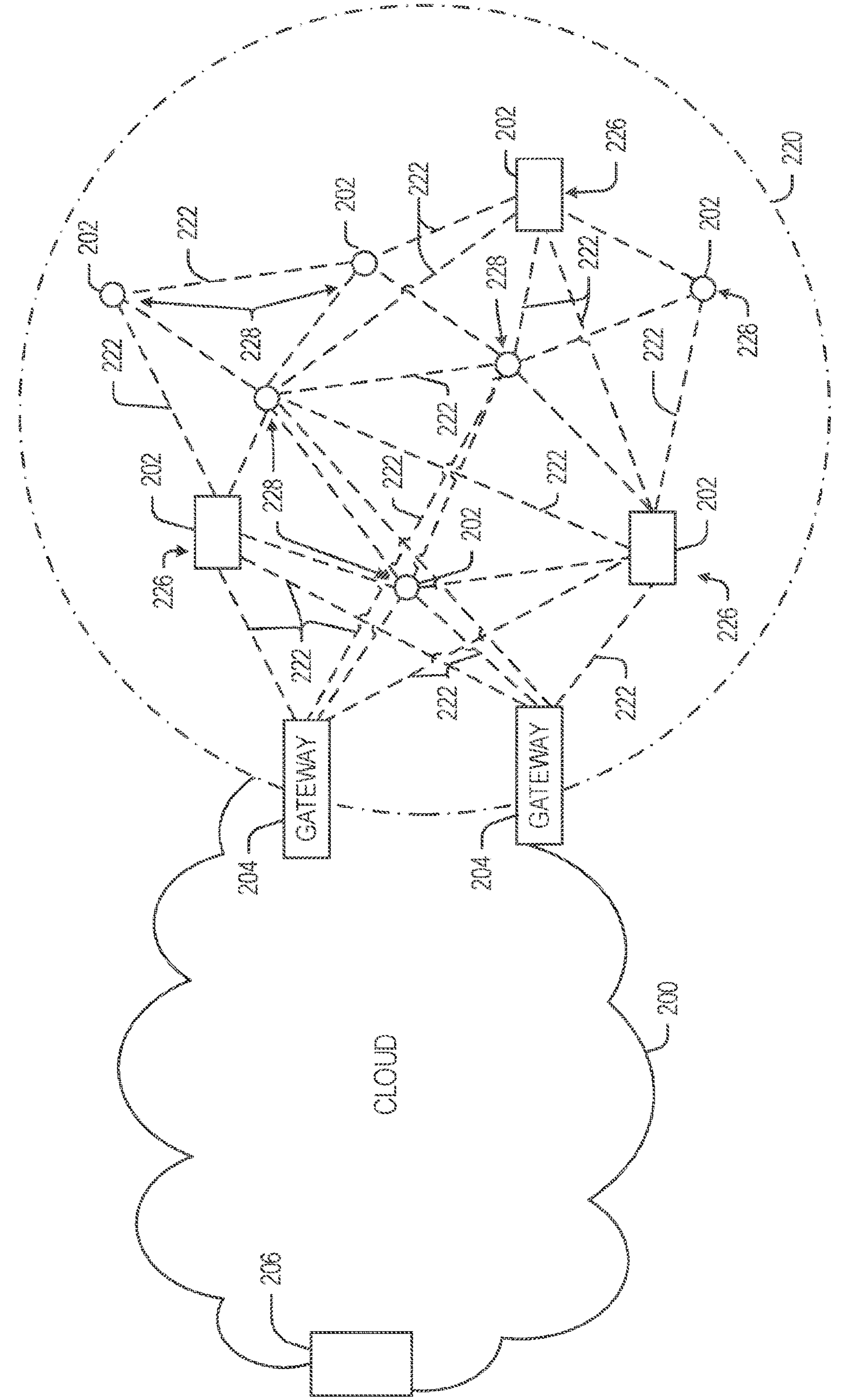
FIG. 2 is a diagram that illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 10 and 11.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2 below.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

Within these and like network settings, various configurations of devices and clouds may exist. For instance, the OCF specification defines the notion of a 'cloud capable' OCF device; however, such devices exist in different domains. For a cloud-capable OCF device and a cloud service or system to communicate with each other, an introduction and setup by a "mediator" service may be used.

Limited techniques have been proposed for onboarding and configuring devices in network contexts involving cloud services or systems. For example, some onboarding approaches intentionally do not attempt to onboard a new device or to establish a trust relationship with a cloud service where trust is defined in terms of the IoT network/fog/domain. Rather, such approaches isolate the new device outside the domain while facilitating connectivity to a cloud 'rendezvous' service that also is outside the domain. This adds a level of complexity and difficulty to successfully integrate new devices and establish connectivity between types of devices.

The techniques and configurations discussed herein address these and other common technical issues with IoT device management and configuration, through the definition and use of a cloud-aware mediator service. In an example, this cloud-aware mediator service may be deployed with an IoT device management services data model using core device definition building blocks. The use of a device management services data model may provide various technical benefits for configuring and use of the mediator services, including in the form of a superior or subordinate mediator service (and multiple peers or instances of such mediator services). Further, the deployment of mediator services in a device management services data model also assists security by allowing such mediator services to be separately operated to separate and sandbox untrusted devices and untrusted domains.

In an example, a mediator service is adapted to perform a specialized onboarding function where the new device and cloud service are onboarded into an enclave domain consisting of only the device and the cloud service (and the mediator service). This configuration may interact to enable limited access to a new device and a cloud service to perform useful functions such as allowing devices from a peer domain (e.g., a new domain that is not yet trusted by all the devices in the first domain) to interact. In contrast, prior approaches typically require that no access (or a very limited or sandboxed second domain) access is provided until the new device is fully onboarded into the first domain. As discussed herein, this mediator service further allows 'sandbox domains' to be instantiated for IoT/fog networks where a new device and a cloud environment can be connected and provisioned for trustworthy interaction involving devices from other domains.

In a further example, an authorization mechanism for a mediator service based on web user login can augment traditional device authorization using certificates, tickets, and access control lists. For instance, web login authorization may be useful for reduced security or safety-sensitive interactions, such as allowing a new device to be accessed by a remote customer service organization that may assist with device troubleshooting, repair or provisioning. Also in a further example, a new device may be accessed by social media "chat rooms" or other Internet capability where temporary, isolated access can be granted while keeping the device separate from the other devices in the regular domain (for safety and security reasons).

The mediator service described herein may be adapted to follow an OCF service and device management design pattern, meaning that the mediator service receives delegation to perform mediator duties according to a process for services delegation, instantiation, provisioning and (if required) de-provisioning. Further, the mediator service may also assist with onboarding-like functions, in a sandbox domain context (e.g., a security-restricted domain, or virtualized environment, or a container, or a trusted execution environment (TEE)).

Figure 3:
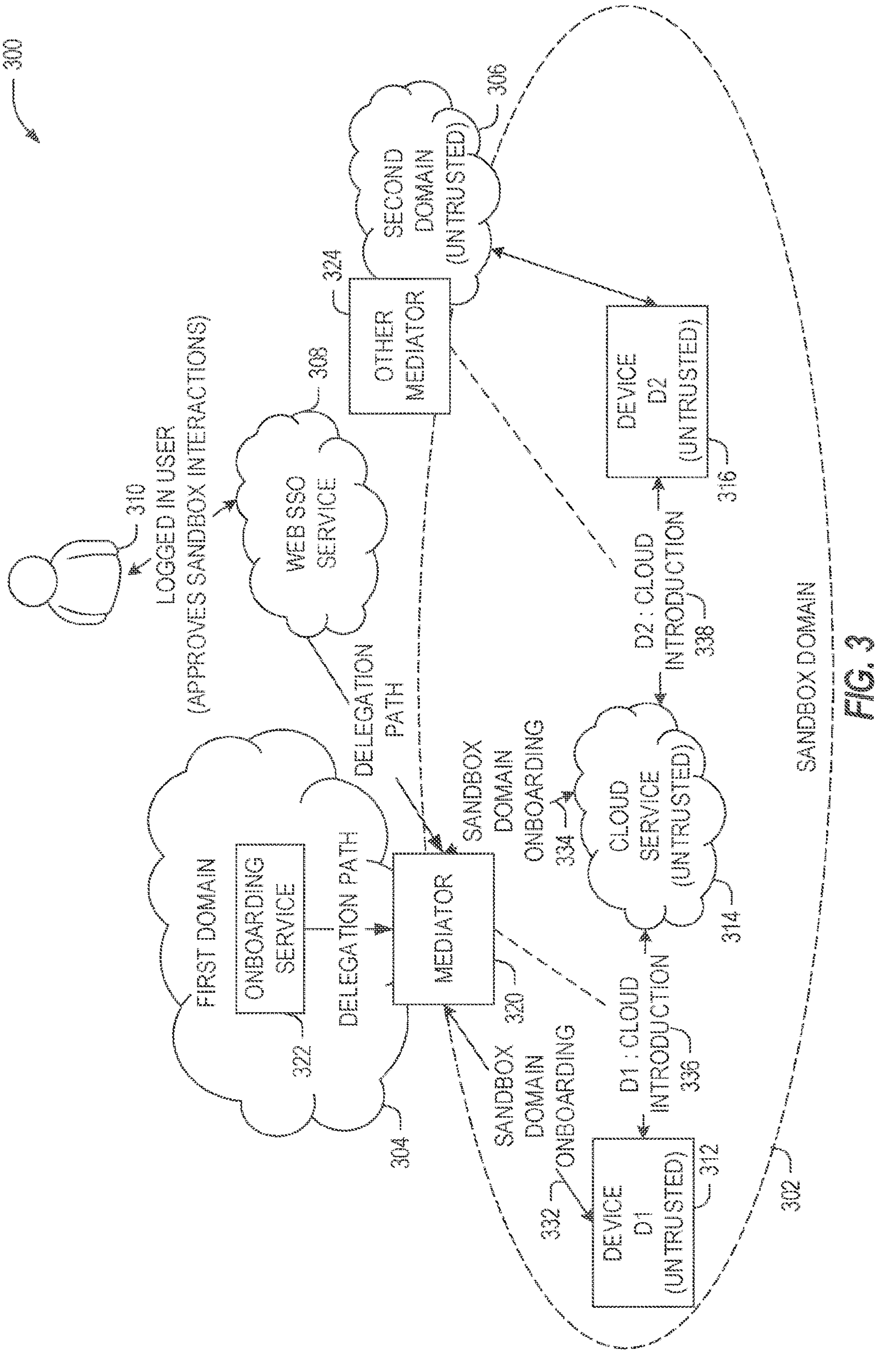
FIG. 3 is a system architecture diagram that illustrates a mediator interconnection between device and a cloud service, according to an example.

FIG. 3 illustrates a system architecture 300 for an example mediator interconnection between a device 312 and a cloud service 314. Specifically, the system architecture 300 illustrates an ad hoc or low-security/low-safety sandbox domain 302 (e.g., a security-restricted network) where untrusted devices (from the perspective of a first domain 304) may be introduced to other untrusted devices (from a second domain 306) for interaction through the cloud service 314. In this example, the cloud service 314 provides discovery and brokering functions enabling a first device D1 312 to communicate with a second device D2 316.

The Mediator 320 (having been delegated authority by the First Domain's onboarding service 322; which oversees maintaining trust of the first domain 304) plays a role, to enable the first device D1 312 to be onboarded into the sandbox domain 302 (e.g., via onboarding operation 332) and a cloud service 314 to also be onboarded into the sandbox domain 302 (e.g., via onboarding operation 334). The Mediator 320 establishes credentials (e.g., via introduction operation 336) enabling secure connection of device D1 312 to the cloud service 314. Additionally, another (e.g., a second) mediator 324 may be used to onboard a second device D2 316 and the first cloud service 314 into the sandbox domain 302, such that the cloud service 314 can supply discovery and message brokering capabilities (e.g., via introduction operation 338) and credentials that device D1 312 and device D2 316 depend on for secure IoT network interactions.

In an example, the Mediator 320 receives authorization from a user 310 who is logged into a web single-sign-on (SSO) authentication service 308 such as an OAuth2, SAML, OpenIDConnect, Kerberos, Active Directory, LDAP or other Directory Service, where the user may approve/deny specific actions performed by the Mediator 320. The Mediator 320 is authorized to perform mediator functions having been delegated this role by the Onboarding Service 322.

The (untrusted) device D1 312 may be an already onboarded and trusted device in the first domain 304, although the device D1 312 may have undergone a device state change that places it into an untrusted state from the perspective of the device being allowed to interact with other trusted devices of the first domain 304 (while in this untrusted state). Subsequent to completing tasks involving the sandbox domain 302, the first device D1 304 may resume trusted operation in the first domain 304 by switching to a trusted device state, such as the device state enabled from a conventional onboarding process by an onboarding service (e.g., the onboarding service 322) of the first domain 304.

Figure 4:
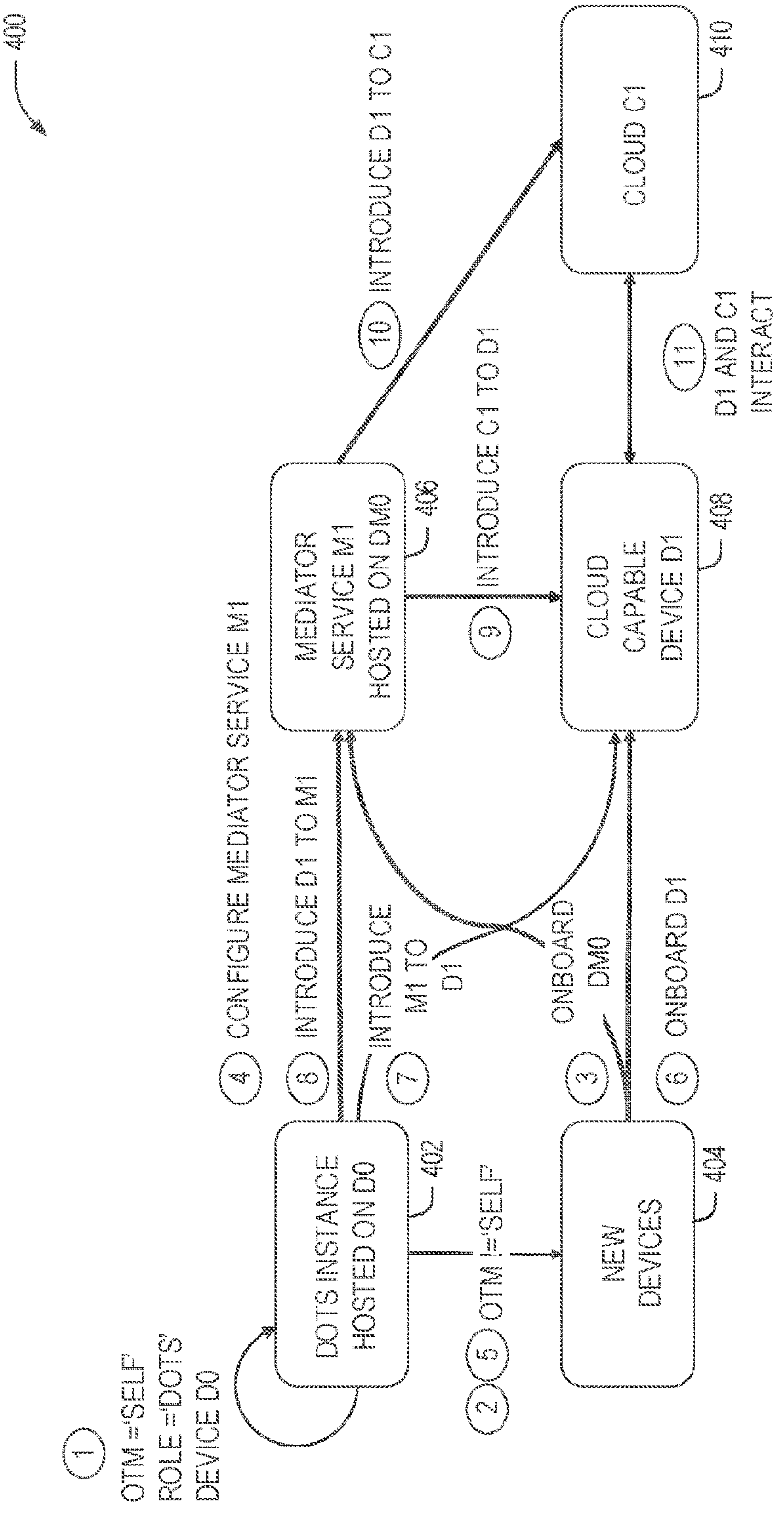
FIG. 4 is an operation flow diagram that illustrates operations involved in onboarding and utilizing a device with a cloud service via a mediator service, according to an example.

FIG. 4 illustrates an operation flow diagram 400 involved in onboarding and utilizing a device with a cloud service via a mediator service, according to an example. In FIG. 4, an example deployment of a service instantiation model with a mediator service is shown, for onboarding and utilizing a device with a cloud service via a mediator service.

Specifically, the model of the flow diagram 400 depicts a potential implementation of how a mediator helper service may be defined in terms of an OCF Service abstraction. The mediator helper service may be instantiated in a similar manner as other lifecycle management services.

As shown, a series of operations are launched, as commenced with a first device owner transfer service (e.g., "DOTS" or "DOXS" device owner management service) instance instantiating itself, and establishing its role as a DOTS service (identified as step "1"), hosted on Device D0 402. This satisfies a first device management objective of onboarding a first Device, as a pre-requisite to instantiating a device management service and other devices. In an example, the DOTS instance (Device 0, D0) is established as a superior device management service. (Other secondary, peer, or subordinate services deployments are not depicted in FIG. 4 for simplicity). Further, the DOTS instance on D0 402 may issue a self-signed role certificate(s) for all services available at this domain, and may create a domain identifier (UUID) used for identification and management operations. The DOTS instance may then proceed to onboard various new devices 404 as added to the domain (identified as step "2").

FIG. 4 further depicts a method sequence in the flow diagram 400, where the Mediator Service (M1), hosted on DM0 406, is first onboarded as an OCF Device (identified as step "3") and then provisioned as a Mediator Service (identified as step "4"). Then another cloud-capable device D1 408 (that corresponds to the Device D1 in FIG. 3, above) is onboarded by the DOTS instance (identified as steps "5", "6"). As a result, the DOTS will introduce the new Device D1 408 to the M1 service (identified as step "7") and vice versa (identified as step "8").

The introduction of the mediator to the cloud-capable device D1 408 (step "7") involves the process of transitioning the cloud-capable device D1 into an "untrusted" device from the perspective of the other devices in a first domain, assuming that the Device D1 408 became "trusted" in the security-restricted domain subsequent to the onboarding. As a result of placing the Device D1 408 into this new state, each of the cloud-to-device introduction and interaction steps (identified as steps "9", "10" and "11") may all proceed in the context of the sandbox domain as described in FIG. 3 above.

In another example, M1 is hosted on D0 402 and while in the context of configuration (e.g., step "5"), the introduction of D1 408 to C1 410 and the introduction of C1 410 to D1 408 (steps "9" and "10") may be performed. In this configuration, a mediator service introduction with D1 (e.g., steps "7" and "8") is not utilized, because D0 402 hosts M1, and the connection with the new devices (e.g., at step "5") may be leveraged to perform the mediator service-to-device introduction (e.g., steps "9" and "10"). However, additional security considerations may occur when M1 is hosted by device D0 402 acting as DOTS, where device D0 402 would be a device that has both the authority of DOTS and the authority of a Mediator Service. By combining services, the setup steps may be made more efficient at the expense of security. That is to say, the separation of duties is not enforced (per se).

In a further example, the mediator service may be defined in terms of an OCF Resource model, allowing the mediator service to inherit other properties of the resource model useful for management of resources, such as the aspects of an "array", "collection", or "bundle" of a defined group of a plurality of resources. For instance, a mediator service resource may inherit properties from a bundle resource (as one of its building blocks) to experience more reliable and safe operation. With use of a bundle resource, referential integrity violations may be minimized, resulting in fewer aborted or partially applied device management operations.

Further, an OCF service bundle may be represented as a bundle (e.g., array, collection, or group) of resources that facilitates a prescribed interaction between a managed device and its service. This bundle may include two sets of resources; a service side and the managed device side. An OCF service may include: (a) service-side resources that contain data and actions this service implements; (b) an identification of Device-side Resources to be managed; (c) properties controlling the service's scope (e.g. peers, subordinates, and the like); and (d) role and service type (e.g. "oic.role.svc.name", "oic.svc.name"). Further, an OCF service bundle may include actions as code (e.g., functions the service implements) or as a Resource (e.g., with a definition of the action resource type and name, such as an array of "<Seq_#> <CRUDN_Action> <Role> <Target_Device><Interface> <Resource> <Predicate> <Next_Action>", where the Sequence of Actions achieves an expected objective (aka "onboarding"), the final <CRUDN_Action>"commits" the sequence of actions as complete, and failure to "commit" the sequence results in replacement of the pre-sequence resource replacing the affected resource). Other examples of OCF service bundles and collections may allow variations to these properties. Further, other implementations of the preceding configurations may involve use of a resource model that is implemented from OCF device management service definitions and resource properties. Many variations to these definitions and resource properties may also be provided based on the particular use case and deployment.

Figure 5:
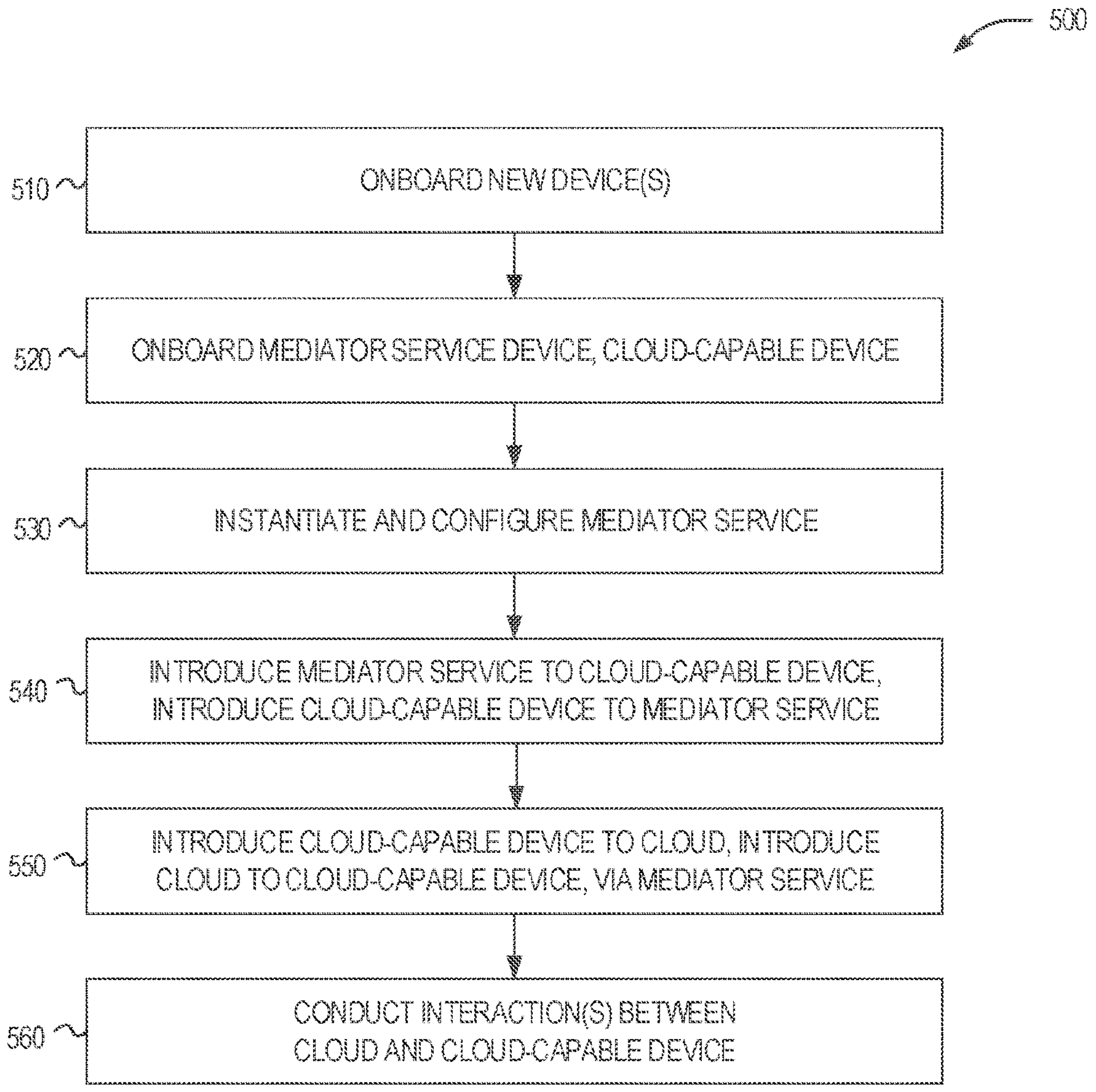
FIG. 5 is a flowchart that illustrates a method for mediator service instantiation and device introduction, according to an example.

FIG. 5 illustrates a flowchart 500 of an example method for mediator service instantiation and operation. As shown, the operations of the flowchart 500 commence with the onboarding of one or more new devices (e.g., Device 0 (D0)) (operation 510), and the onboarding of one or more mediator service devices (e.g., DM0) and one or more cloud-capable devices (e.g., Devices D1) (operation 520) to the sandbox (security-restricted) domain. The onboarding of these additional respective device instances may be established as a pre-requisite prior to instantiating device management services on these respective devices.

The operations of the flowchart 500 continue with the instantiation and configuration of the mediator service (operation 530) on an onboarded device. This is followed by the introduction of a mediator service to the cloud-capable device and the introduction of the cloud-capable device to the mediator service (operation 540) in the sandbox (security-restricted domain). This is followed by the introduction of the cloud-capable device to the cloud, and the introduction of the cloud to the cloud-capable device (operation 550) within the security-restricted (sandbox) domain. Based on the introductions, various interactions may occur between the devices in respective roles, allowing the cloud and cloud-capable device to conduct interactions with each other within the security-restricted domain (operation 560).

Figure 6:
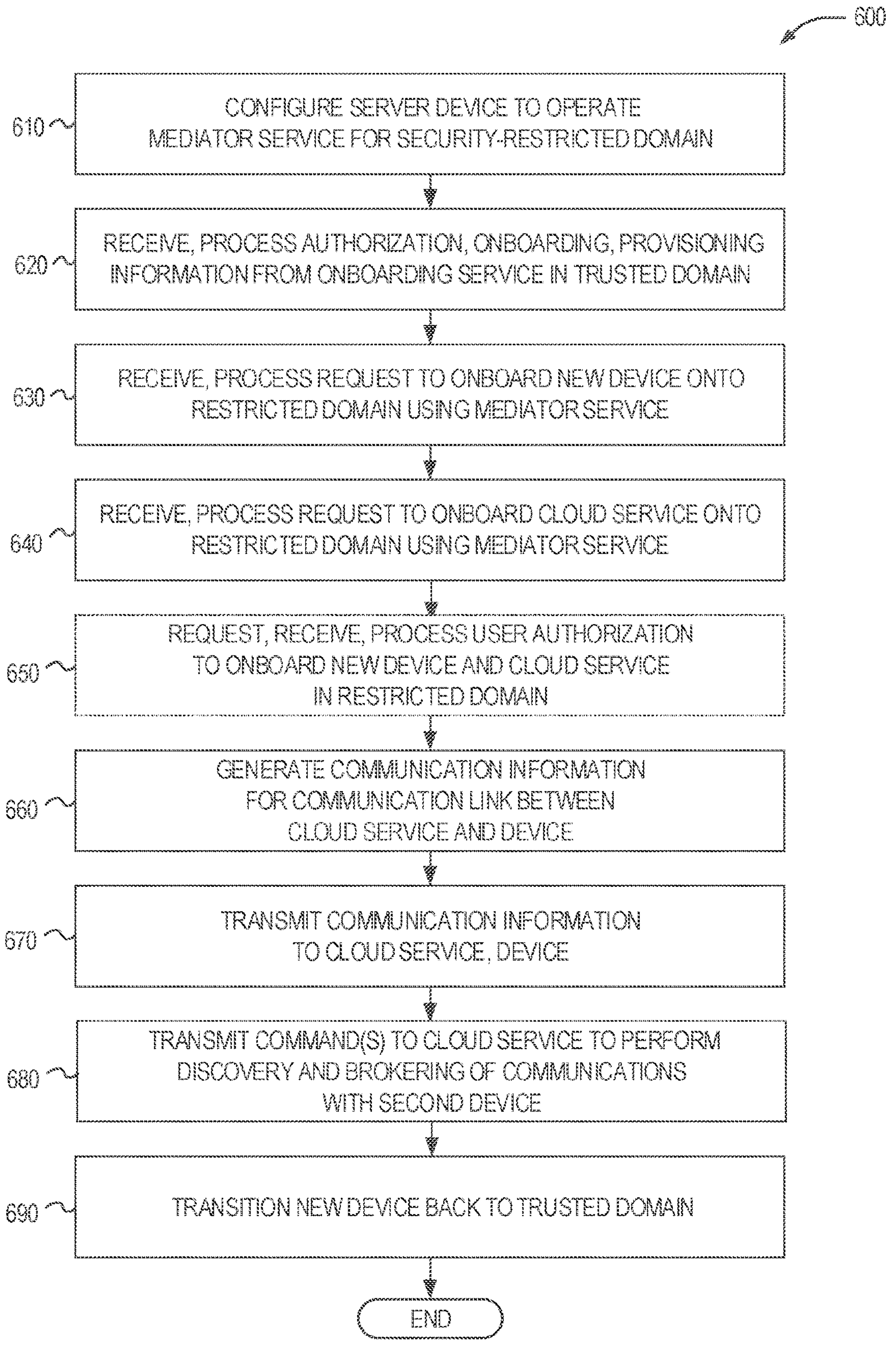
FIG. 6 is a flowchart that illustrates a method performed by a mediator service for cloud-to-device introduction operations, according to an example.

FIG. 6 illustrates a flowchart 600 of an example method performed by a mediator service for cloud-to-device introduction operations. The following operations are depicted from the perspective of a mediator service or other intermediate IoT device or system which operates in connectivity with one or more respective cloud and device entities. However, it will be understood that the techniques of flowchart 600 may be further adapted from the perspective of a client-side device, server-side device, or systems involving both client, server, and intermediate entities.

The flowchart 600 begins with the configuration of a server device (e.g., further referred to as a "mediator device"), to operate as a mediator service for a security-restricted domain (operation 610). In an example, the configuration may include various forms of delegation and accompanying data to implement the mediator service within the security-restricted domain, received from an onboarding service operating in a secure domain. Further, the server device may receive and process device onboarding information, mediator service provisioning information, and other authorization data from the onboarding service operating in the secure domain (operation 620). In an example, the mediator service and the onboarding service operate on different devices; in another example, the mediator service and the onboarding service each operate on the same mediator device.

The flowchart 600 continues with operations, using the mediator service, to receive and process a request to onboard a new client device onto the restricted (e.g., sandbox) domain (operation 630). In an example, the security-restricted domain restricts communication operations of the client device to a defined security level, within such domain. The flowchart further continues with operations, using the mediator service, to receive and process a request to onboard a cloud service onto the security-restricted domain (operation 640). In an example, the security-restricted domain also restricts communication operations of the cloud service to the same defined security level, within such domain.

The flowchart 600 continues with an optional operation to receive and process a user authorization of the requests to onboard the client device and the cloud service (operation 650). In an example, the user authorization is received in response to use of an authentication service; in a further example, the authentication service is a single-sign-on (SSO) service utilized by an administrative user, such that the SSO service operates as an OAuth2, Security Assertion Markup Language (SAML), OpenIDConnect, Kerberos, Active Directory, or Lightweight Directory Access Protocol (LDAP) authentication service. Other forms of automated or negotiated authorization of the requests may also be implemented.

The flowchart 600 continues with the generation of communication information to establish a communication link, between the cloud service and the client device, at the defined security level in the security-restricted domain (operation 660). This communication is transmitted or otherwise provided to the client device and the cloud service (operation 670). In an example, the network communications used to perform the operations comprise Representational State Transfer (RESTful) interactions among one or more IoT network topologies. In a further example, the network communications are conducted according to one or more OCF specifications.

The flowchart 600 continues with the transmission of one or more commands to the cloud service, to perform discovery and brokering of communications and communication links (via the cloud service) with additional devices in the security-restricted domain (operation 680). For instance, a second client device may be introduced and discovered for communication to the first client device. In another example, the second client device may perform similar onboarding operations applied to the first client device (operations 630, 650, 660), allowing the mediator service to manage onboarding of multiple client devices within the restricted domain.

The flowchart 600 concludes with the transition of the new client device, from the security-restricted domain, back to the trusted domain (operation 690). In an example, the client device is onboarded by the onboarding service of the trusted domain, and operates in an untrusted device state within the trusted domain during communications within the security-restricted domain. The client device also may switch to operate in the trusted domain after completion of communications with a second client device, such as where the client device is switched to operate in the trusted domain in response to re-onboarding the client device onto the trusted domain by the onboarding service. Other variations to onboarding and device states may also occur.

Further management of intermediate and extended network configurations may also be enabled by the following process access service (PAS) configurations and techniques. In an example, a PAS enables wide-area network access from a remote IoT device (e.g., a "roaming" device) to a local fog of devices, with such fog of devices including one or multiple devices that operates as a distributed platform having computing and storage resources, as discussed above). As used herein, the terms "remote" and "roaming" are generally used interchangeably to refer to devices not included within a fog, network namespace, or network topology, in contrast to the "local" devices that are connected within a fog or network. (In such a scenario, a namespace indicates a convention for associating names or identities or identifiers so as to disambiguate one thing from the other or to translate from one namespace to another, such as where a DNS namespace is translated to an IPv4 or IPv6 address name).

Thus, whether a device is considered "remote" or "roaming" may be based on the network access considerations and connectivity configurations, rather than being based exclusively on geographic location or proximity. Further, it may be possible for a device to be located geographically proximate while still being "remote" or "roaming" to a fog or network topology.

Existing approaches for roaming device connectivity provide a variety of technical, security, and usability limitations that are addressed with the present techniques and configurations. For example, one existing approach involves the use of web-based access systems (such as an HTTP proxy server located at an edge router) where any device with a browser or HTTP-enabled mobile app connects to the edge router to obtain access. However, in this scenario, the edge router must host an HTTP server/proxy service and must be hosted at a (often-costly) well-known IP address that is well-known to the various devices. In addition to the configuration overhead that this approach provides, the edge router operates to pass all traffic (e.g., all HTTP traffic), including traffic from unknown devices. In some configurations of an edge router, HTTPS may be employed, but the use of HTTPS involves all devices establishing a trust relationship with the edge router. Finally, the edge router, if compromised, poses a security risk to every device inside and to roaming devices; and use of an edge router also serves as a single point of failure.

As another example of an existing approach, a service may be hosted on a cloud platform (such as Amazon Web Services) that is available to inside devices to connect to using a well-known URL to the cloud platform. Inside the network, local devices that want to connect to the roaming device(s) may connect out and roaming device(s) may also connect into the cloud service. For example, certain implementations of an Extensible Messaging and Presence Protocol (XMPP) server utilize this cloud-based configuration. However, this conventional approach involves a significant overhead because both the client and the server IoT devices must connect to the cloud server proactively. This conventional approach is not feasible for the many IoT devices that are "sleepy" and are awoken by local 'wake-on-demand' semantics. Further, a conventional cloud service requires the sleepy device to wake up periodically (such as few minutes or seconds) to "check" the cloud server to see if a roaming device wants to access it. Finally, the conventional cloud service approach also trusts the cloud service to maintain credentials common to all devices that are exposed on a cloud server which is usually maintained by a third party; this third party may be motivated to disclose the keys or monitor clear-text activity in the cloud server.

These and other technical limitations are addressed using the proxy access techniques and configuration discussed herein. Unlike the use of a conventional cloud service, the presently disclosed PAS configuration preserves device-to-device interactions, from end-to-end. In addition, details of the exchanged communications (the IoT data) are not disclosed to the PAS. Also in addition, local IoT devices are not required to periodically wake up to poll the PAS; instead, the PAS may initiate the connection to the local device (to wake it) but the access session is between the originating client device rather than the PAS. Thus, with use of the present techniques, sleepy IoT devices do not need to have different behavior for a "cloud-aware" or "roaming-aware" operational mode; instead, such devices may be woken up in a normal fashion.

In an example, access control for a roaming device is addressed in the present techniques and configuration through the use of an access control policy. The PAS employs a separate access control policy that authorizes proxy access rights. These rights are in addition to device-to-device rights that normally are provisioned for local device interactions. The PAS server does not require access to clear-text IoT message bodies in order to perform device 'proxy' operations, and consequently, the PAS does not need to be trusted to the same or higher degree that a local IoT network/fog administrative console would be trusted. Moreover, the PAS may be hosted by a third party such as a cloud services provider, allowing additional extensibility and flexibly in network and processing utilization.

Also in an example, roaming devices wishing to participate in cloud proxy access may separately register with the PAS (and deregister) on-demand according to use case requirements. For instance, local and roaming devices may be directed to undergo a one-time registration with the PAS that may require additional authorization approval by an IoT network administrator or fog owner entity. As a specific example, an OAuth2 Authorization Server (AS) may supply an OAuth2 token that is authorized by the user/owner that further contains a proxy access policy used to inform the PAS regarding creation/authoring of the proxy access rules. In another example, PAS registration may be further authorized by a human using an OAuth2 message exchange involving the approver. Otherwise, authorization to participate as a PAS enabled device may be achieved using a headless IoT provisioning and management service that configures device credentials and PAS role. As non-limiting examples relevant to the OCF specification implementations, OCF/cred and/acl resources may be used for headless configuration for use with a PAS.

Also in an example, data conveyed using the PAS may be secured end-to-end using message level encryption and signing such as JOSE, COSE, CMS, WSSecurity, and the like. In a further example, the data may rely on a session protocol such as TLS, DTLS, Sigma, and the like, for data that is tunneled over an HTTPS or CoAP transport that is used between the PAS and the local or roaming peer devices.

Figure 7:
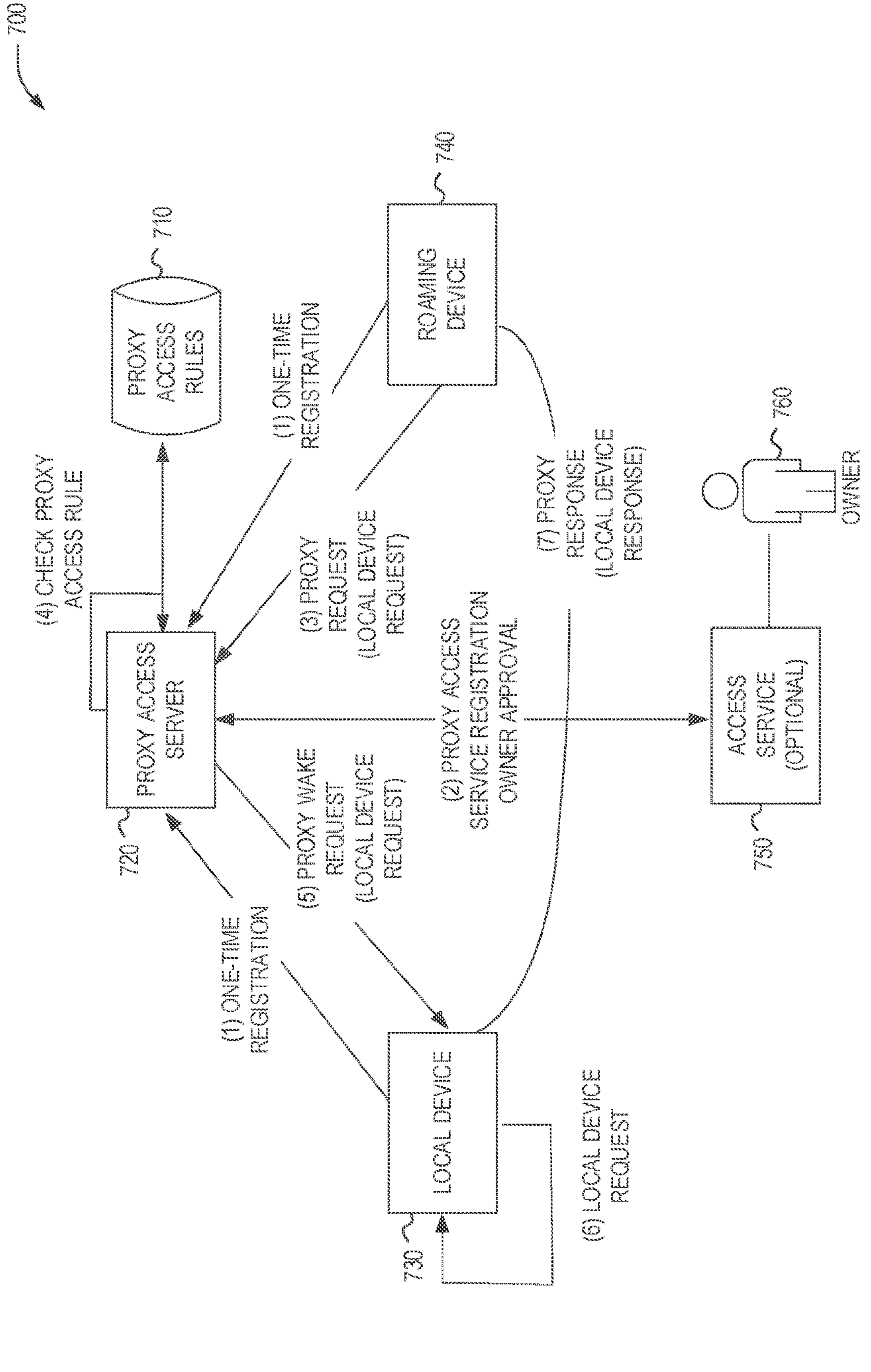
FIG. 7 illustrates a block diagram of a system architecture for a proxy access service, according to an example.

FIG. 7 is block diagram that illustrates an example system architecture for a proxy access server (PAS). As shown in FIG. 7, a PAS 720 is a cloud-hosted service that manages a set of Proxy Access Rules (PAR) 710 that describe which roaming device(s) (e.g., roaming device 740) may access (or be accessed by) which local device(s) (e.g., local device 730). The following depicts the sequential flows of operations among the PAS 720, the local device 730, the remote (roaming) device 740, and optionally an authentication service (AS) 750 (such as an access service).

As shown in operation (1), a one-time registration step may be used to establish device details for consideration when authoring PAR entries. This may be performed between the PAS 720 and a local device 730, or between the PAS 720 and a roaming device 740.

As shown in operation (2), an optional Authentication Service (AS) 750 may be employed to obtain a "live" approval from an owner 760 (e.g., a human administrator) of the decision to register the local or the remote devices 730, 740 with the PAS 720. Otherwise (or in addition), a device onboarding/management utility (e.g., an OBT) may issue a credential authorizing both the local device 730 and the remote device 740 to access the PAS 720 using a credential having a "proxy.access.role" authorization.

As shown in operation (3), the remote device 740 makes a Local Device Request (LDR) (e.g., CoAP GET "<local_device_id>:/ldresource") by encapsulating the LDR in a secure message (e.g., Proxy Request message) using an end-to-end credential (already provisioned at initial device onboarding) and a message protection scheme (such as COSE, JOSE, CMS, or the like), or by using a (D)TLS tunnel where the end-to-end credential is used to negotiate an end-to-end session. The Proxy Request message is sent to the PAS 720 using an established peer credential between the PAS 720 and the remote device 740. (This credential is established when the PAS 720 and remote device 740 were onboarded into the local network using the network's onboarding scheme).

As shown in operation (4), the PAS 720 inspects the Proxy Request message that identifies the remote device 740 as the originator and the local device 730 as the recipient and searches the PAR database for a matching rule. For example, the OCF/acl2 resource may be used as a syntax for representing the PAR data set 710. The Proxy Request message may, additionally, contain a list of resources hosted by the local device that the remote device is authorized to access while roaming. For instance, the Proxy Request may contain the resource(s) the Local Device Request message requests (and the local device 730 will verify consistency between the Proxy Request and Local Device Request).

As shown in operation (5), the PAS 720 opens a connection into the local network following any appropriate technique including protocols such as Interactive Connectivity Establishment (ICE), Session Traversal Utilities for NAT (STUN), or other edge services that enables the PAS 720 to connect to a local network or fog, and route messages to the local device 730. A sleepy device may employ a wake-on-LAN or other wake-on interface that the PAS 720 utilizes to wake the device.

As shown in operation (6), the Local Device 730 accepts the Proxy Wake Request and discovers it contains a Local Device Request originating from the remote device 740. The Local Device 730 processes the Local Device Request (for example by verifying the COSE wrapper and then applying the end-to-end request; "GET/ldresource . . . "). The Local Device Response is computed and packaged into a Proxy Response enveloping message.

As shown in operation (7), the Proxy Response message is returned to the PAS 720 which forwards it to the Roaming Device 740. The remote device 740 verifies the response is from the PAS 720 and then unpacks the enveloped Local Device Response. The remote device 740 verifies the enveloped response is from the local device 730 with which it already shares a security association.

As will be apparent, the data exchange (operations (1)-(7)) may be reversed to support a bi-lateral information exchange. Further, the data exchange may support many-to-one publish-subscribe interactions as well by using the PAR entry to identify and match multiple recipient devices. For instance, the /acl2 resource used to describe access from a roaming device to multiple local devices (LD1, LD2, . . . , LDn) may use the array feature of the /acl2 resource to describe the target devices.

As noted above, FIG. 7 illustrates the operation of an optional AS (Authorization Service) 750 being used to obtain user authorization from the owner 760. FIG. 7 also illustrates an access control evaluation of a proxy access rule occurring at the PAS 720 device, which is a cloud-hosted entity. In another example, some or all of the proxy access rules and any accompanying access control entry (ACE) may be hosted by the local device 730 (e.g., the resource server). For instance, the PAS 720 may forward an AS token to the local device 730, for an AS token that is obtained from the owner 760 when the roaming device 740 (e.g., the resource requestor) requests access to a local device resource. In this scenario, the proxy wake request or a local device request message may communicate the AS token as an additional parameter. The local device 730 may evaluate this AS token to obtain two pieces of information: 1) authorization from the owner 760 that the request is approved, and 2) the identity of the roaming device 740. The local device 730 uses the identity of the roaming device 740 to locate an ACE value that matches the source matching criteria (as is depicted further in FIGS. 8A and 8B, below). The local device 730 also performs an additional check to ensure there is a local ACE policy that authorizes the PAS 720 to forward the token versus evaluating the access locally on the proxy (PAS) device. However, even in this example, the PAS 720 continues to relay the Local Device Response (operation 7, discussed above) through the PAS 720 if local Device ACE policies permit roaming device access.

Figure 8A:
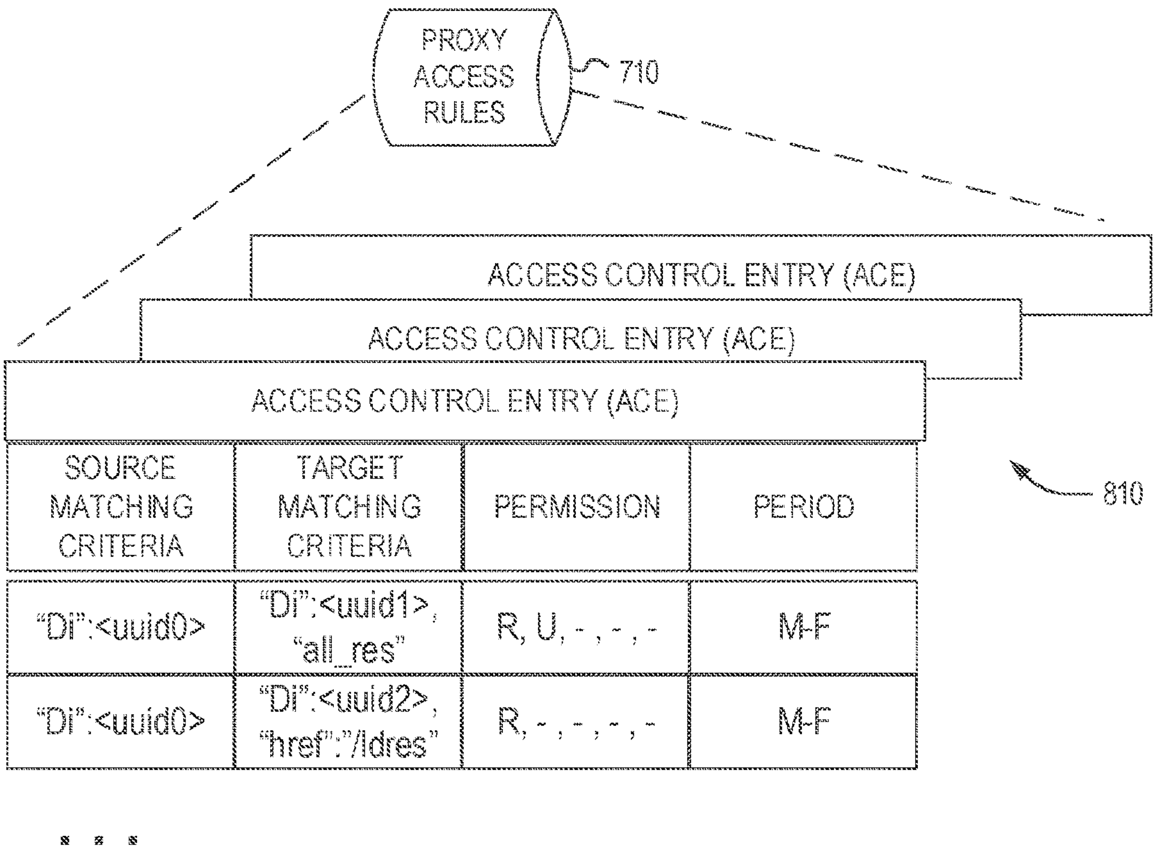
FIG. 8A is a block diagram that illustrates various access control entries storable in a proxy access rules data set, according to an example.

FIG. 8A is a block diagram illustrating examples of various access control entries storable in a proxy access rules 710 data set. As illustrated, a Proxy Access Rule (PAR) table 810 includes multiple instances of an ACE, with each ACE including a source matching criteria, a target matching criteria, a permission grant expression, and a validity period in which the rule is active.

The proxy access configuration described herein differs from a traditional IoT device interaction in that the point of enforcement is the PAS (a cloud-hosted intermediary) rather than the local resource server. However, the PAR may be expressed using the same ACE expression(s) that may be applied locally. This allows the local device to further audit or otherwise verify the PAR ACE(es) are not in conflict with its local access policies, even if the semantics of access differ however. The PAR ACE is asserting the Source and Target entities are both authorized for the given permission in the context of a cloud/PAS interaction.

Figure 8B:
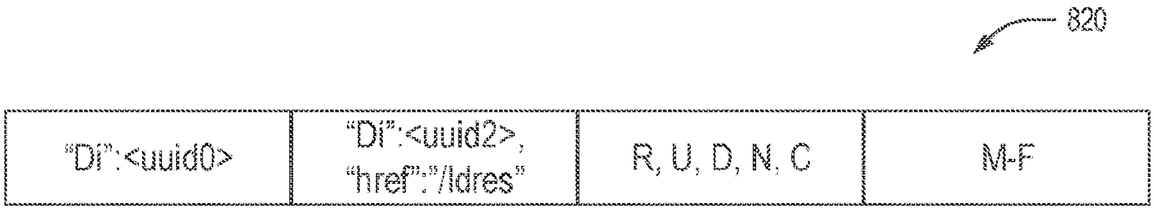
FIG. 8B illustrates a block diagram of a local access control entry storable in a proxy access rules data set, according to an example.

FIG. 8B is a block diagram that illustrates an example local access control entry 820 storable in a proxy access rules data set (e.g., PAR 710). The local device ACE may grant additional privileges when the remote device is accessing the local device while connected via a local network or fog.

In certain examples, the local device <uuid2> has a local ACE policy (e.g., as shown in FIG. 8B) where the remote device <uuid0> is permitted additional access when the connection is made via a local connection context. The end-to-end protocol described above enables the local device to detect when the access is proxied via a PAS.

In an example, the Proxy Request message contents includes the PAR ACE policy that was used by the PAS to justify sending an encapsulated Local Device Request message. The local device verifies the PAR ACE entry does not contain more privilege than is allowed locally (for example) according to a site security policy.

The Local Device 730 may further verify authenticity of the Proxy Access Rules by consulting a Blockchain containing a history of message exchanges in operations (1) to (7) described with reference to FIG. 7 above. A reconstruction of all steps would reveal or describe provenance of each ACE entry in the PAR database as well as the interactions that were allowed by the PAS and other routing activities occurring between the Roaming Device and the Local Device. In this scenario, a local device (or a third-party auditor) may walk the provenance chain to see if any operations were fallacious. For example, a local device may choose to make proof of a provenance chain a condition of access, such as may be appropriate for IoT applications involving control of resources having significant consequences to people, environment, animals, property, or reputation.

Figure 9:
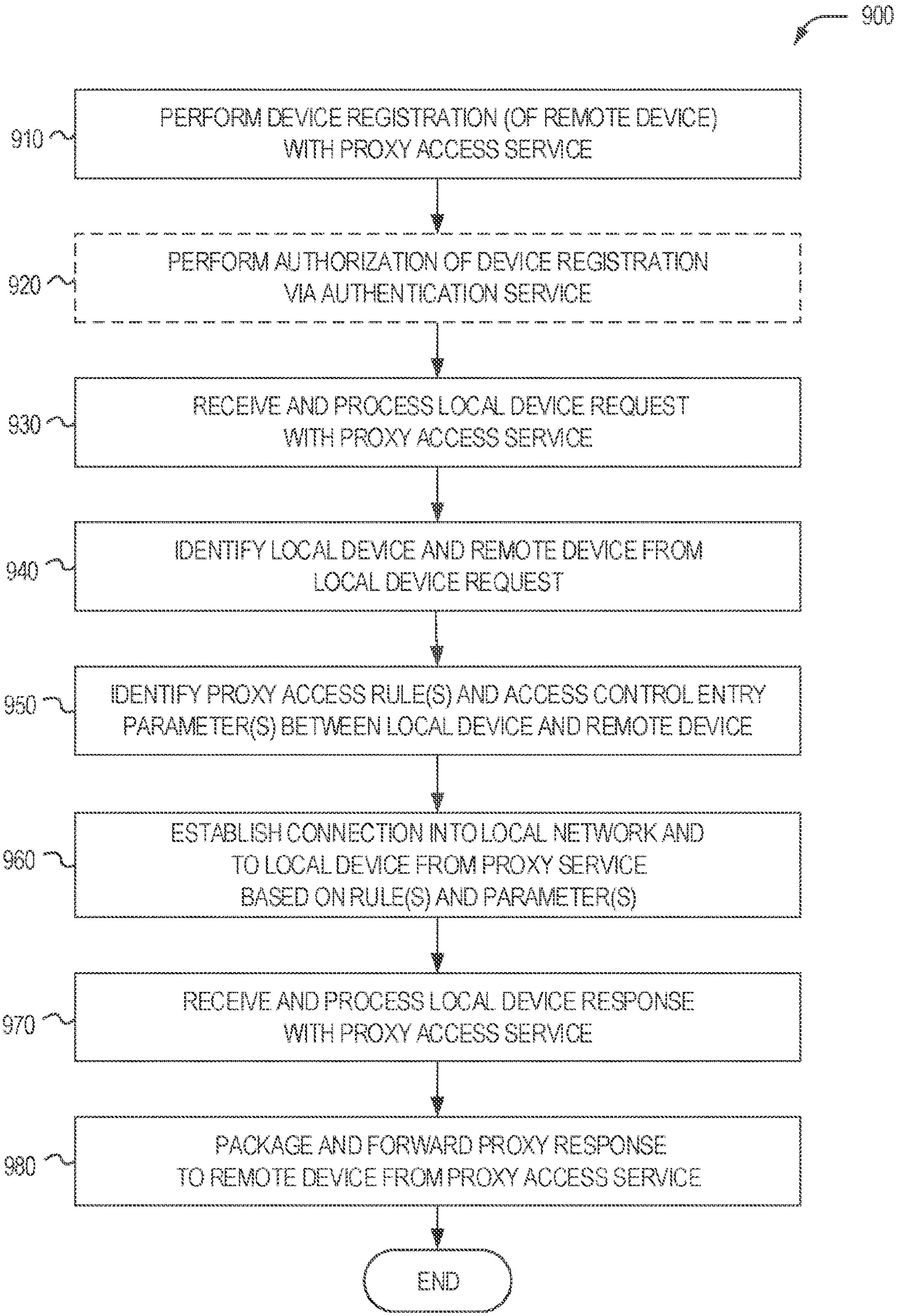
FIG. 9 illustrates a flowchart of an example technique for facilitating communications between a remote device and a local device via a proxy access service, according to an example.

FIG. 9 illustrates a flowchart 900 of an example technique for facilitating communications between a remote device and a local device via a proxy access service. As shown, the operations of the flowchart 900 are depicted as sequential; in other examples, the operations of the flowchart 900 may be performed in another order or with additional (or fewer) operations. Further, the flowchart 900 is depicted from the perspective of operations performed at the PAS, in response to a request from a remote (roaming) device to access a local device. It will be understood that variations to the operations may occur in scenarios where the local device requests to access the remote device, and the like.

As shown, the operations of the flowchart 900 include the performance of device registration of the remote device with the PAS (operation 910). In an example, the device registration is a one-time step that establishes the device details in relation to the proxy access rules, policies, and other authorization characteristics. The operations of the flowchart 900 also include the optional performance of authorization with a device registration, such as an authentication transaction request provided to an authentication service managed by a local network owner or administrator (operation 920). In some examples, this registration is conducted by the owner or administrator as a "live" event or in a real-time operation; in some examples, authorization and credentials may be automatically provided from the authentication service according to predefined policies and roles.

The operations of the flowchart 900 continue with the receipt and processing of the local device request by the PAS, for a local device request that is sent by the remote device (operation 930). In response to the local device request, further processing and identification operations performed by the PAS include the identification of the local device and the remote device from the local device request (operation 940), and the identification of relevant proxy access rule(s) and access control entry parameter(s) established for connections between the local device and the remote device (operation 950). As discussed above, the relevant proxy access rules used for these access conditions may be established with access control entry records defined with source matching criteria, target matching criteria, access permission, and period characteristics.

In response to the identification and verification of the various access conditions, a connection attempt is established from the remote device into the local network, to connect with the local device, based on the identified proxy access rule(s) and access control entry parameter(s) (operation 960). In an example, this local device request may be provided with a wake request or other device action request. The PAS further operates to receive and process a local device response to the connection attempt (operation 970), and the PAS operates to package and forward this local device response to the remote device (operation 980). Additional configuration or adaptation to the operations above may be automated or enhanced based on network or security considerations, such as discussed with reference to the operational flow in FIG. 7 above.

In an example, the operations and functionality described above with reference to FIGS. 3 to 9 may be embodied by an IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor, set of processors, or processing circuitry (e.g., a computer) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 10:
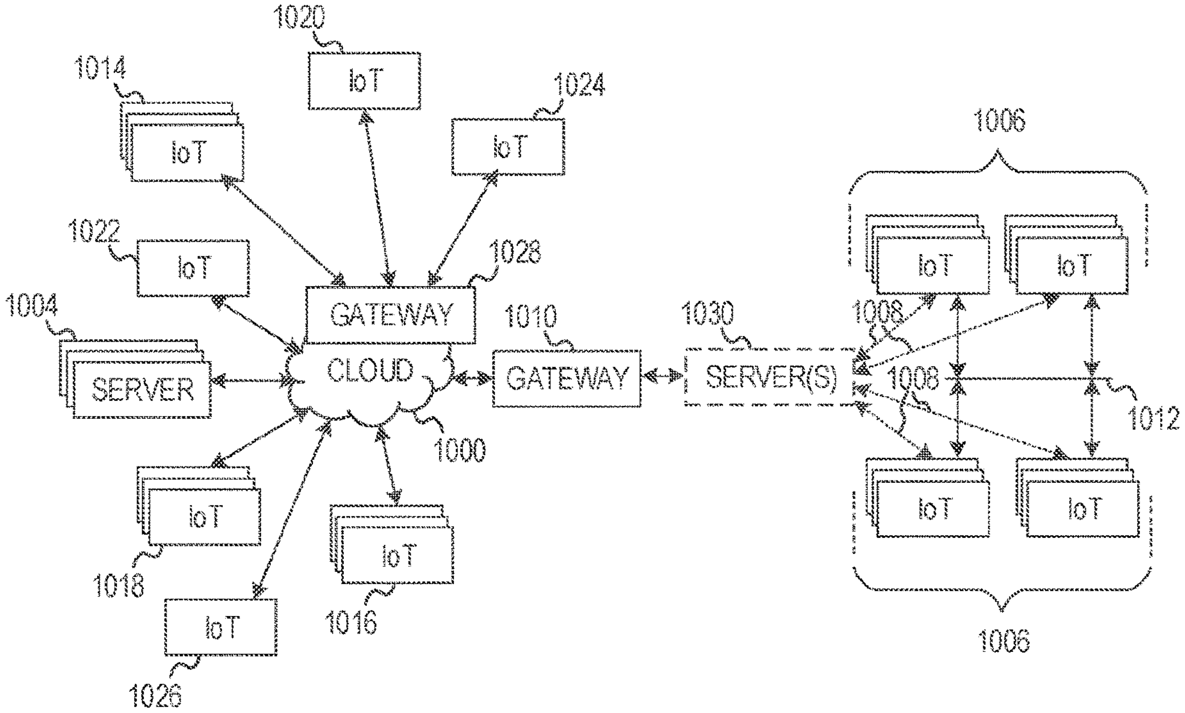
FIG. 10 illustrates a block diagram of a network illustrating communications among a number of IoT devices, according to an example.

FIG. 10 illustrates a drawing of a cloud computing network, or cloud 1000, in communication with a number of Internet of Things (IoT) devices. The cloud 1000 may represent the Internet, or may be a local area network (LAN), or a wide area network (WAN), such as a proprietary network for a company. The IoT devices may include any number of different types of devices, grouped in various combinations. For example, a traffic control group 1006 may include IoT devices along streets in a city. These IoT devices may include stoplights, traffic flow monitors, cameras, weather sensors, and the like. The traffic control group 1006, or other subgroups, may be in communication with the cloud 1000 through wired or wireless links 1008, such as LPWA links, optical links, and the like. Further, a wired or wireless sub-network 1012 may allow the IoT devices to communicate with each other, such as through a local area network, a wireless local area network, and the like. The IoT devices may use another device, such as a gateway 1010 or 1028 to communicate with remote locations such as the cloud 1000; the IoT devices may also use one or more servers 1030 to facilitate communication with the cloud 1000 or with the gateway 1010. For example, the one or more servers 1030 may operate as an intermediate network node to support a local edge cloud or fog implementation among a local area network. Further, the gateway 1028 that is depicted may operate in a cloud-to-gateway-to-many edge devices configuration, such as with the various IoT devices 1014, 1020,

1024 being constrained or dynamic to an assignment and use of resources in the cloud 1000.

Other example groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, with another IoT fog device or system (not shown, but depicted in FIG. 2), or a combination therein. The groups of IoT devices may be deployed in various residential, commercial, and industrial settings (including in both private or public environments).

As may be seen from FIG. 10, a large number of IoT devices may be communicating through the cloud 1000. This may allow different IoT devices to request or provide information to other devices autonomously. For example, a group of IoT devices (e.g., the traffic control group 1006) may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

Clusters of IoT devices, such as the remote weather stations 1014 or the traffic control group 1006, may be equipped to communicate with other IoT devices as well as with the cloud 1000. This may allow the IoT devices to form an ad-hoc network between the devices, allowing them to function as a single device, which may be termed a fog device or system (e.g., as described above with reference to FIG. 2).

Figure 11:
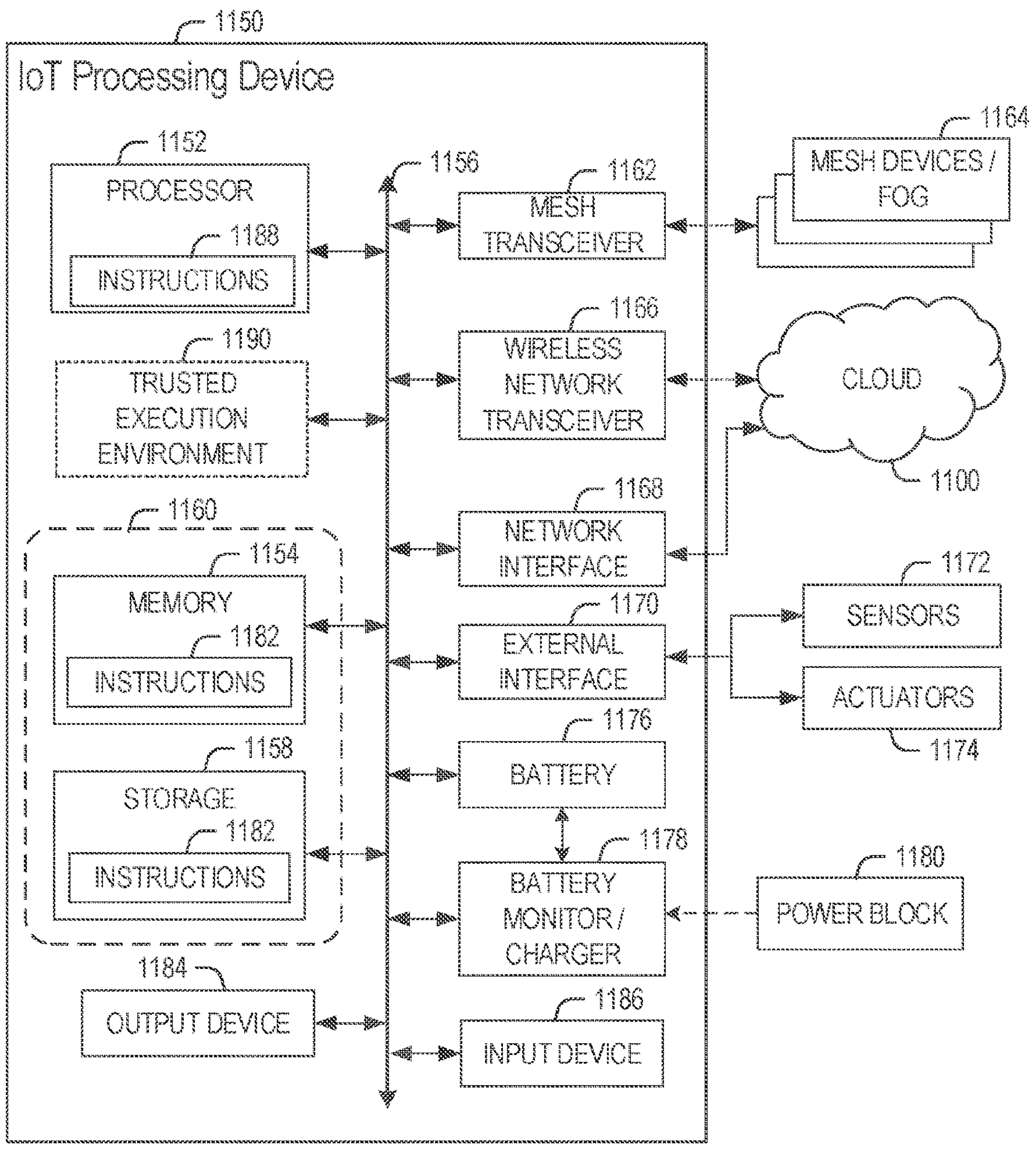
FIG. 11 illustrates a block diagram for an example IoT processing system architecture upon which any one or more of the techniques (e.g., operations, processes, methods, and methodologies) discussed herein may be performed, according to an example.

FIG. 11 is a block diagram of an example of components that may be present in an IoT device 1150 for implementing the techniques described herein. The IoT device 1150 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1150, or as components otherwise incorporated within a chassis of a larger system. Additionally, the block diagram of FIG. 11 is intended to depict a high-level view of components of the IoT device 1150. However, some of the components shown may be omitted, additional components may be present, and different arrangement of the components shown may occur in other implementations.

The IoT device 1150 may include processing circuitry in the form of a processor 1152, which may be a microprocessor, a multi-core processor, a multithreaded processor, an ultra-low voltage processor, an embedded processor, or other known processing elements. The processor 1152 may be a part of a system on a chip (SoC) in which the processor 1152 and other components are formed into a single integrated circuit, or a single package, such as the Edison™ or Galileo™ SoC boards from Intel. As an example, the processor 1152 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A7 processor from Apple® Inc., a Snapdragon™ processor from Qualcomm® Technologies, Inc., or an OMAP™ processor from Texas Instruments, Inc.

The processor 1152 may communicate with a system memory 1154 over an interconnect 1156 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the interconnect 1156. In an example the storage 1158 may be implemented via a solid state disk drive (SSDD). Other devices that may be used for the storage 1158 include flash memory cards, such as SD cards, microSD cards, xD picture cards, and the like, and USB flash drives. In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components may communicate over the interconnect 1156. The interconnect 1156 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1156 may be a proprietary bus, for example, used in a SoC based system. Other bus systems may be included, such as an I2C interface, an SPI interface, point to point interfaces, and a power bus, among others.

The interconnect 1156 may couple the processor 1152 to a mesh transceiver 1162, for communications with other mesh devices 1164. The mesh transceiver 1162 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1164. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1162 may communicate using multiple standards or radios for communications at different range. For example, the IoT device 1150 may communicate with close devices, e.g., within about 10 meters, using a local transceiver based on BLE, or another low power radio, to save power. More distant mesh devices 1164, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1166 may be included to communicate with devices or services in the cloud 1100 via local or wide area network protocols. The wireless network transceiver 1166 may be a LPWA transceiver that follows the IEEE 802.15.4, or IEEE 802.15.4g standards, among others. The IoT device 1150 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1162 and wireless network transceiver 1166, as described herein. For example, the radio transceivers 1162 and 1166 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1162 and 1166 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1166, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1168 may be included to provide a wired communication to the cloud 1100 or to other devices, such as the mesh devices 1164. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1168 may be included to allow connect to a second network, for example, a NIC 1168 providing communications to the cloud over Ethernet, and a second NIC 1168 providing communications to other devices over another type of network.

Given the variety of types of applicable communications from the device to another component or network, applicable communications circuitry used by the device may include or be embodied by any one or more of components 1162, 1166, 1168, or 1170. Accordingly, in various examples, applicable means for communicating (e.g., receiving, transmitting, etc.) may be embodied by such communications circuitry.

The interconnect 1156 may couple the processor 1152 to an external interface 1170 that is used to connect external devices or subsystems. The external devices may include sensors 1172, such as accelerometers, level sensors, flow sensors, optical light sensors, camera sensors, temperature sensors, a global positioning system (GPS) sensors, pressure sensors, barometric pressure sensors, and the like. The external interface 1170 further may be used to connect the IoT device 1150 to actuators 1174, such as power switches, valve actuators, an audible sound generator, a visual warning device, and the like.

In some optional examples, various input/output (I/O) devices may be present within, or connected to, the IoT device 1150. For example, a display or other output device 1184 may be included to show information, such as sensor readings or actuator position. An input device 1186, such as a touch screen or keypad may be included to accept input. An output device 1184 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1150.

A battery 1176 may power the IoT device 1150, although in examples in which the IoT device 1150 is mounted in a fixed location, it may have a power supply coupled to an electrical grid. The battery 1176 may be a lithium ion battery, or a metal-air battery, such as a zinc-air battery, an aluminum-air battery, a lithium-air battery, and the like.

A battery monitor/charger 1178 may be included in the IoT device 1150 to track the state of charge (SoCh) of the battery 1176. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1178 may communicate the information on the battery 1176 to the processor 1152 over the interconnect 1156. The battery monitor/charger 1178 may also include an analog-to-digital (ADC) convertor that allows the processor 1152 to directly monitor the voltage of the battery 1176 or the current flow from the battery 1176. The battery parameters may be used to determine actions that the IoT device 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the IoT device 1150. A wireless battery charging circuit, such as an LTC4020 chip from Linear Technologies of Milpitas, Calif., among others, may be included in the battery monitor/charger 1178. The specific charging circuits chosen depend on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application specific integrated circuit (ASIC).

In an example, the instructions 1182 provided via the memory 1154, the storage 1158, or the processor 1152 may be embodied as a non-transitory, machine readable medium 1160 including code to direct the processor 1152 to perform electronic operations in the IoT device 1150. The processor 1152 may access the non-transitory, machine readable medium 1160 over the interconnect 1156. For instance, the non-transitory, machine readable medium 1160 may be embodied by devices described for the storage 1158 of FIG. 11 or may include specific storage units such as optical disks, flash drives, or any number of other hardware devices. The non-transitory, machine readable medium 1160 may further include, provide, or invoke instructions 1188 to direct the processor 1152 to perform a specific sequence or flow of actions, for example, as described with respect to the flowchart(s) and block diagram(s) of operations and functionality depicted above.

In still a specific example, the instructions 1188 on the processor 1152 (separately, or in combination with the instructions 1188 of the machine readable medium 1160) may configure execution or operation of a trusted execution environment (TEE) 1190. In an example, the TEE 1190 operates as a protected area accessible to the processor 1152 for secure execution of instructions and secure access to data. Various implementations of the TEE 1190, and an accompanying secure area in the processor 1152 or the memory 1154 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1150 through the TEE 1190 and the processor 1152.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a mediator device, comprising: communications circuitry; processing circuitry; and a memory device including instructions embodied thereon, wherein the instructions, which when executed by the processing circuitry, configure the processing circuitry to perform operations of a mediator service to: process a request to onboard a client device onto a security-restricted domain, the request received from the client device via the communications circuitry, wherein the security-restricted domain restricts communication operations of the client device to a defined security level; process a request to register a cloud service with the security-restricted domain, the request received from the cloud service via the communications circuitry, wherein the security-restricted domain restricts communication operations of the cloud service to the defined security level; generate communication information usable to establish a communication link, between the cloud service and the client device, at the defined security level in the security-restricted domain; and cause the communications circuitry to transmit the communication information to the client device and the cloud service.

In Example 2, the subject matter of Example 1 includes, operations to: cause the communications circuitry to transmit a command to the cloud service to perform discovery and brokering of additional devices in the security-restricted domain, the discovery and brokering to allow a second client device to communicate with the client device via the cloud service.

In Example 3, the subject matter of Examples 1-2 includes, operations to: process a user authorization of the requests to onboard the client device and register the cloud service, the user authorization received from an authentication service via the communications circuitry.

In Example 4, the subject matter of Example 3 includes, the authentication service being a single-sign-on (SSO) service utilized by an administrative user, such that the SSO service comprises at least one of a: OAuth2, Security Assertion Markup Language (SAML), OpenIDConnect, Kerberos, Active Directory, or Lightweight Directory Access Protocol (LDAP) authentication service.

In Example 5, the subject matter of Examples 1-4 includes, operations to: process a delegation to implement the mediator service within the security-restricted domain, the delegation to implement the mediator service received from an onboarding service via the communications circuitry, wherein the onboarding service operates within a trusted domain.

In Example 6, the subject matter of Example 5 includes, operations to: process device onboarding information received from the onboarding service, the device onboarding information received via the communications circuitry; and process mediator service provisioning information received from the onboarding service, the provisioning information received via the communications circuitry; wherein the mediator service and the onboarding service operate on different devices.

In Example 7, the subject matter of Examples 5-6 includes, the mediator service and the onboarding service each operating on the mediator device.

In Example 8, the subject matter of Examples 5-7 includes, the client device operating in the trusted domain, wherein the client device is onboarded by the onboarding service, and wherein the client device operates in an untrusted device state within the trusted domain during communications with the security-restricted domain.

In Example 9, the subject matter of Examples 5-8 includes, the client device switching to operate in the trusted domain after completion of communications with a second client device, wherein the client device switches to operate in the trusted domain in response to onboarding of the client device by the onboarding service.

In Example 10, the subject matter of Examples 1-9 includes, the mediator service, the client device, and the cloud service being the only participants of the security-restricted domain.

In Example 11, the subject matter of Examples 1-10 includes, network communications used to cause the respective operations comprising Representational State Transfer (RESTful) interactions among one or more Internet of Things (IoT) network topologies, and wherein the network communications are conducted according to one or more Open Connectivity Foundation (OCF) specifications.

Example 12 is a method, comprising a plurality of operations executed with at least one processor and memory of a mediator device, to implement a mediator service for device-to-cloud connectivity at the mediator device, the operations comprising: receiving a request to onboard a client device onto a security-restricted domain, wherein the security-restricted domain restricts communication operations of the client device to a defined security level; receiving a request to register a cloud service with the security-restricted domain, wherein the security-restricted domain restricts communication operations of the cloud service to the defined security level; generating communication information to establish a communication link, between the cloud service and the client device, at the defined security level in the security-restricted domain; and transmitting the communication information to the client device and the cloud service.

In Example 13, the subject matter of Example 12 includes, transmitting a command to the cloud service to perform discovery and brokering of additional devices in the security-restricted domain, the discovery and brokering to allow a second client device to communicate with the client device via the cloud service.

In Example 14, the subject matter of Examples 12-13 includes, receiving and processing a user authorization of the requests to onboard the client device and register the cloud service, the user authorization received from an authentication service.

In Example 15, the subject matter of Example 14 includes, the authentication service being a single-sign-on (SSO) service utilized by an administrative user, wherein the SSO service comprises at least one of a: OAuth2, Security Assertion Markup Language (SAML), OpenIDConnect, Kerberos, Active Directory, or Lightweight Directory Access Protocol (LDAP) authentication service.

In Example 16, the subject matter of Examples 12-15 includes, receiving and processing a delegation, received from an onboarding service, to implement the mediator service within the security-restricted domain, wherein the onboarding service operates within a trusted domain.

In Example 17, the subject matter of Example 16 includes, operations to: receiving and processing device onboarding information from the onboarding service; and receiving and processing mediator service information from the onboarding service; wherein the mediator service and the onboarding service operate on different devices.

In Example 18, the subject matter of Examples 16-17 includes, the mediator service operating on a same device as the onboarding service.

In Example 19, the subject matter of Examples 16-18 includes, the client device operating in the trusted domain, wherein the client device is onboarded by the onboarding service, and wherein the client device operates in an untrusted device state within the trusted domain during communications with the security-restricted domain.

In Example 20, the subject matter of Examples 16-19 includes, the client device switching to operate in the trusted domain after completion of communications with a second client device, wherein the client device switches to operate in the trusted domain occurs in response to onboarding of the client device by the onboarding service.

In Example 21, the subject matter of Examples 12-20 includes, the mediator service, the client device, and the cloud service being the only participants of the security-restricted domain.

In Example 22, the subject matter of Examples 12-21 includes, network communications used to perform the operations comprising Representational State Transfer (RESTful) interactions among one or more Internet of Things (IoT) network topologies, and wherein the network communications are conducted according to one or more Open Connectivity Foundation (OCF) specifications.

Example 23 is a machine-readable storage medium including instructions, wherein the instructions, when executed by a processing circuitry of a device, cause the processing circuitry to perform operations of any of Examples 12 to 22.

Example 24 is a system, comprising: a client device, comprising communications circuitry and processing circuitry, the processing circuitry adapted to: generate and communicate a request to onboard the client device onto a security-restricted domain, the request transmitted via the communications circuitry, wherein the security-restricted domain restricts communication operations of the client device to a defined security level; and configure, based on communication information provided in response to the request to onboard, a communication link to a cloud service; a mediator service device, comprising communications circuitry and processing circuitry, the processing circuitry adapted to: process the request to onboard the client device onto the security-restricted domain, the request received from the client device via the communications circuitry; process a request to register the cloud service with the security-restricted domain, the request received from the cloud service via the communications circuitry, wherein the security-restricted domain restricts communication operations of the cloud service to the defined security level; generate communication information usable to establish a communication link between the cloud service and the client device, at the defined security level in the security-restricted domain; and cause the communications circuitry to provide the communication information to the client device and the cloud service.

In Example 25, the subject matter of Example 24 includes, an onboarding service device, comprising communications circuitry and processing circuitry, the processing circuitry adapted to: generate and communicate, to the mediator service device using the communications circuitry, a delegation to implement a mediator service at the mediator service device, wherein the onboarding service device operates within a trusted domain that is distinct from the security-restricted domain.

In Example 26, the subject matter of Examples 24-25 includes, the cloud service, the cloud service communicatively coupled to one or more additional client devices, wherein the one or more additional client devices are operably coupled to the cloud service via one or more Internet of Things (IoT) network topologies.

Example 27 is an apparatus, comprising: means for receiving a request to onboard a client device onto a security-restricted domain, wherein the security-restricted domain restricts communication operations of the client device to a defined security level; means for receiving a request to register a cloud service with the security-restricted domain, wherein the security-restricted domain restricts communication operations of the cloud service to the defined security level; means for generating communication information to establish a communication link, between the cloud service and the client device, at the defined security level in the security-restricted domain; and means for transmitting the communication information to the device and the cloud service. In a specific example, the means for receiving and transmitting may be implemented by the device 1150 through the examples of processing circuitry and communications circuitry as discussed above.

In Example 28, the subject matter of Example 27 includes, means for transmitting a command to the cloud service to perform discovery and brokering of additional devices in the security-restricted domain, the discovery and brokering to allow a second client device to communicate with the client device via the cloud service. In a specific example, the means for transmitting may be implemented by the device 1150 through the examples of processing circuitry and communications circuitry as discussed above.

In Example 29, the subject matter of Examples 27-28 includes, means for receiving and processing a user authorization of the requests to onboard the client device and register the cloud service, the user authorization received from an authentication service. In a specific example, the means for receiving and processing may be implemented by the device 1150 through the examples of processing circuitry and communications circuitry as discussed above.

In Example 30, the subject matter of Example 29 includes, means for processing the user authorization received from the authentication service, wherein the authentication service is a single-sign-on (SSO) service utilized by an administrative user, and wherein the SSO service comprises at least one of a: OAuth2, Security Assertion Markup Language (SAML), OpenIDConnect, Kerberos, Active Directory, or Lightweight Directory Access Protocol (LDAP) authentication service. In a specific example, the means for processing may be implemented by the device 1150 through the examples of processing circuitry and communications circuitry as discussed above.

In Example 31, the subject matter of Examples 27-30 includes, means for receiving and processing a delegation, received from an onboarding service, to operate the apparatus within the security-restricted domain, wherein the onboarding service operates within a trusted domain. In a specific example, the means for receiving and processing may be implemented by the device 1150 through the examples of processing circuitry and communications circuitry as discussed above.

In Example 32, the subject matter of Example 31 includes, means for receiving and processing device onboarding information from the onboarding service; and means for receiving and processing mediator service information from the onboarding service. In a specific example, the means for receiving and processing may be implemented by the device 1150 through the examples of processing circuitry and communications circuitry as discussed above.

In Example 33, the subject matter of Example 32 includes, means for operating the mediator service and the onboarding service on the apparatus. In a specific example, the means for operating may be implemented by the device 1150 through the examples of processing circuitry as discussed above.

In Example 34, the subject matter of Examples 32-33 includes, means for communicating with the client device, wherein the client device operates in the trusted domain, wherein the client device is onboarded by the onboarding service, and wherein the client device operates in an untrusted device state within the trusted domain during communications with the security-restricted domain. In a specific example, the means for communicating may be implemented by the device 1150 through the examples of processing circuitry and communications circuitry as discussed above.

In Example 35, the subject matter of Examples 32-34 includes, means for causing the client device to operate in the trusted domain after completion of communications with a second client device, wherein the client device switches to operate in the trusted domain occurs in response to onboarding of the client device by the onboarding service. In a specific example, the means for causing the operation may be implemented by the device 1150 through the examples of processing circuitry as discussed above.

In Example 36, the subject matter of Examples 27-35 includes, means for controlling the participants of the security-restricted domain, wherein the apparatus, the client device, and the cloud service are the only participants of the security-restricted domain. In a specific example, the means for controlling may be implemented by the device 1150 through the examples of processing circuitry as discussed above.

In Example 37, the subject matter of Examples 27-36 includes, means for transmitting network communications, wherein the network communications used to perform the operations comprise Representational State Transfer (RESTful) interactions among one or more Internet of Things (IoT) network topologies, and wherein the network communications are conducted according to one or more Open Connectivity Foundation (OCF) specifications. In a specific example, the means for transmitting may be implemented by the device 1150 through the examples of processing circuitry and communications circuitry as discussed above.

In Example 38, the subject matter of Examples 27-37 includes, means for receiving network communications, wherein the network communications used to perform the operations comprise Representational State Transfer (RESTful) interactions among one or more Internet of Things (IoT) network topologies, and wherein the network communications are conducted according to one or more Open Connectivity Foundation (OCF) specifications. In a specific example, the means for receiving may be implemented by the device 1150 through the examples of processing circuitry and communications circuitry as discussed above.

Example 39 is a device fog adapted to perform the operations of any of Examples 1 to 38.

Example 40 is a cloud service server adapted to perform the operations of a cloud service invoked by any of Examples 1 to 38.

Example 41 is an edge computing device adapted to perform the operations of a client device invoked by any of Examples 1 to 38.

Example 42 is a credential management service server adapted to perform the operations of credentialing invoked by any of Examples 1 to 38.

Example 43 is an authentication management service server adapted to perform the operations of authentication invoked by any of Examples 1 to 38.

Example 44 is a device onboarding service server adapted to perform the operations of onboarding invoked by any of Examples 1 to 38.

Example 45 is an Open Connectivity Foundation (OCF) device, configured as a server, client, or intermediary according to an OCF specification, comprising means to implement the operations of any of Examples 1 to 38.

Example 46 is an Internet of Things (IoT) network topology, the IoT network topology comprising respective communication links adapted to perform communications for the operations of any of Examples 1 to 38.

Example 47 is a network comprising respective devices and device communication mediums for performing any of the operations of Examples 1 to 38.

Example 48 is an apparatus comprising means for performing any of the operations of Examples 1 to 38.

Example 49 is a system to perform the operations of any of Examples 1 to 48.

Example 50 is a method to perform the operations of any of Examples 1 to 48.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A system for networked device management, the system comprising:

a processor; and memory, including instructions stored thereon that, when executed by the processor, cause the processor to perform operations, the operations comprising:

receiving a request to onboard a client device onto a security-restricted domain, wherein the security-restricted domain restricts communication operations of the client device to a defined security level;

receiving a request to register a remote service with the security-restricted domain, wherein the security-restricted domain restricts communication operations of the remote service to the defined security level;

transmitting communication information to the client device and the remote service to establish communications at the defined security level in the security-restricted domain; and processing a delegation to implement a mediator service within the security-restricted domain, wherein the delegation to implement the mediator service is received from an onboarding service, wherein the onboarding service operates within a trusted domain, wherein the client device switches to operate in the trusted domain after completion of a communication with a second client device in the security-restricted domain and after onboarding of the client device to the security-restricted domain.

2. The system of claim 1, wherein the request to onboard the client device is received from the client device, and wherein the request to register the remote service is received from the remote service.

3. The system of claim 2, wherein the request to onboard the client device and the request to register the remote service are received via communication circuitry communicatively coupled to the processor.

4. The system of claim 3, wherein the request to onboard the client device includes a request to communicate with the second client device, and wherein the operations further comprise:

receiving a request to onboard the second client device onto the security-restricted domain, wherein the request to onboard the second client device is received from the second client device via the communication circuitry, and wherein the security-restricted domain restricts operations of the second client device to the defined security level.

5. The system of claim 4, wherein the request to onboard the second client device includes a request to communicate with the client device.

6. The system of claim 5, the operations comprising:

transmitting the communication information to the second client device; and transmitting a command to the remote service to perform discovery and brokering of additional devices in the security-restricted domain, the discovery and brokering to allow the second client device to communicate with the client device via the remote service.

7. The system of claim 1, wherein the communication information is transmitted via a communication link, and wherein the communication link includes a communication path between the remote service, the client device, and the second client device at the defined security level in the security-restricted domain.

8. The system of claim 1, the operations comprising:

receiving a user authorization of the request to onboard the client device and the request register the remote service, wherein the user authorization is received from an authentication service.

9. The system of claim 1, the operations comprising:

receiving device onboarding information from the onboarding service; and receiving mediator service provisioning information from the onboarding service, wherein the mediator service and the onboarding service operate on different devices.

10. At least one non-transitory computer-readable medium with instructions stored thereon that, when executed by a processor of a computing device, cause the processor to perform operations, the operations comprising:

receiving a request to onboard a client device onto a security-restricted domain, wherein the security-restricted domain restricts communication operations of the client device to a defined security level;

receiving a request to register a remote service with the security-restricted domain, wherein the security-restricted domain restricts communication operations of the remote service to the defined security level;

transmitting communication information to the client device and the remote service to cause communications at the defined security level in the security-restricted domain; and processing a delegation to implement an intermediate service within the security-restricted domain, the delegation to implement the intermediate service received from an onboarding service, wherein the onboarding service operates within a trusted domain, wherein the client device is configured to switch to operate in a trusted domain after completion of a communication with a second client device in the security-restricted domain, and after onboarding of the client device to the security-restricted domain.

11. The at least one non-transitory computer-readable medium of claim 10, wherein the request to onboard the client device includes a request to communicate with the second client device, and wherein the operations further comprise:

receiving a request to onboard the second client device onto the security-restricted domain, wherein the request to onboard the second client device is received from the second client device via communications circuitry coupled to the processor, and wherein the security-restricted domain restricts operations of the second client device to the defined security level.

12. The at least one non-transitory computer-readable medium of claim 11, wherein the request to onboard the second client device includes a request to communicate with the client device.

13. The at least one non-transitory computer-readable medium of claim 12, the operations comprising:

transmitting the communication information to the second client device; and transmitting a command to the remote service to perform discovery and brokering of additional devices in the security-restricted domain, the discovery and brokering to allow the second client device to communicate with the client device via the remote service.

14. The at least one non-transitory computer-readable medium of claim 10, wherein the communication information is transmitted via a communication link, and wherein the communication link includes a communication path between the remote service, the client device, and the second client device at the defined security level in the security-restricted domain.

15. The at least one non-transitory computer-readable medium of claim 10, the operations comprising:

receiving a user authorization of the request to onboard the client device and the request register the remote service, wherein the user authorization is received from an authentication service.

16. The at least one non-transitory computer-readable medium of claim 10, the operations comprising:

receiving device onboarding information from the onboarding service; and receiving intermediate service provisioning information from the onboarding service, wherein the intermediate service and the onboarding service operate on different devices.

17. A method for networked device management, the method comprising:

receiving a request to onboard a client device onto a security-restricted domain, wherein the security-restricted domain restricts communication operations of the client device to a defined security level;

receiving a request to register a cloud service with the security-restricted domain, wherein the security-restricted domain restricts communication operations of the cloud service to the defined security level;

transmitting communication information to the client device and the cloud service to enable communications at the defined security level in the security-restricted domain; and processing a delegation to implement a mediator service within the security-restricted domain, the delegation to implement the mediator service received from an onboarding service, wherein the onboarding service operates within a trusted domain, wherein the client device switches to operate in the trusted domain after completion of a communication with a second client device in the security-restricted domain, and in response to onboarding of the client device to the security-restricted domain.

18. The method of claim 17, wherein the request to onboard the client device is received from the client device, and wherein the request to register the cloud service is received from the cloud service.

19. The method of claim 17, wherein the request to onboard the client device includes a request to communicate with the second client device, and wherein the method further comprises:

receiving a request to onboard the second client device onto the security-restricted domain, and wherein the security-restricted domain restricts operations of the second client device to the defined security level.

20. The method of claim 19, wherein the request to onboard the second client device includes a request to communicate with the client device.

21. The method of claim 17, further comprising:

transmitting the communication information to the second client device; and transmitting a command to the cloud service to perform discovery and brokering of additional devices in the security-restricted domain, the discovery and brokering to allow the second client device to communicate with the client device via the cloud service.

22. The method of claim 17, wherein the communication information is transmitted via a communication link, and wherein the communication link further includes a communication path between the cloud service, the client device, and the second client device at the defined security level in the security-restricted domain.

23. The method of claim 17, further comprising:

receiving a user authorization of the request to onboard the client device and the request register the cloud service, wherein the user authorization is received from an authentication service.

24. The method of claim 17, further comprising:

receiving device onboarding information from the onboarding service; and receiving mediator service provisioning information from the onboarding service, wherein the mediator service and the onboarding service operate on different devices.

* * * * *